United States Patent
Amzaleg et al.

(10) Patent No.: US 9,613,255 B2
(45) Date of Patent: Apr. 4, 2017

(54) SYSTEMS, METHODS AND COMPUTER PROGRAM PRODUCTS FOR SIGNATURE DETECTION

(71) Applicant: Applied Materials Israel Ltd., Rehovot (IL)

(72) Inventors: Moshe Amzaleg, Beer Sheva (IL); Ariel Shkalim, D.N. Sade-Gat (IL); Efrat Rozenman, Aseret (IL)

(73) Assignee: Applied Materials Israel Ltd., Rehovot (IL)

( * ) Notice: Subject to any disclaimer, the term of this patent is extended or adjusted under 35 U.S.C. 154(b) by 163 days.

(21) Appl. No.: 14/673,712

(22) Filed: Mar. 30, 2015

(65) Prior Publication Data

US 2016/0292492 A1    Oct. 6, 2016

(51) Int. Cl.
*G06K 9/62* (2006.01)
*G06K 9/00* (2006.01)
*G06F 3/048* (2013.01)

(52) U.S. Cl.
CPC ......... *G06K 9/00161* (2013.01); *G06F 3/048* (2013.01); *G06K 9/6202* (2013.01); *G06T 2207/30148* (2013.01)

(58) Field of Classification Search
CPC ... G06T 2207/30148; G01N 21/9501–21/9505
See application file for complete search history.

(56) References Cited

U.S. PATENT DOCUMENTS

| | | | |
|---|---|---|---|
| 5,982,920 A | 11/1999 | Tobin, Jr. et al. | |
| 6,718,526 B1 | 4/2004 | Eldredge et al. | |
| 7,084,968 B2 | 8/2006 | Shibuya et al. | |
| 7,676,077 B2 | 3/2010 | Kulkarni et al. | |
| 8,254,661 B2 | 8/2012 | Auerbach | |
| 8,255,172 B2 | 8/2012 | Auerbach | |
| 8,553,970 B2 | 10/2013 | Auerbach | |
| 2009/0037134 A1* | 2/2009 | Kulkarni | G01N 21/9501 702/127 |

OTHER PUBLICATIONS

Cheng, Huiyuan, et al. "Automatic yield management system for semiconductor production test." Electronic Design, Test and Application (DELTA), 2011 Sixth IEEE International Symposium on. IEEE, 2011.

Ooi, Melanie Po-Leen, et al. "Defect cluster recognition system for fabricated semiconductor wafers." Engineering Applications of Artificial Intelligence 26.3 (2013): 1029-1043.

* cited by examiner

*Primary Examiner* — Brian P Werner
(74) *Attorney, Agent, or Firm* — Lowenstein Sandler LLP

(57) ABSTRACT

Methods, systems, and computer program products for signature detection. One example of a method includes: acquiring an article defect density map comprising a plurality of sections corresponding to a first resolution level which is indicative of defect numbers for the sections, and determining a distribution representative of the defect numbers or function thereof; determining a threshold in accordance with said distribution, and identifying sections, out of said plurality of sections in the article defect density map, with defect numbers or function thereof above the threshold; and clustering at least part of adjoining identified sections, into one or more signatures, thus detecting said one or more signatures.

20 Claims, 12 Drawing Sheets

SYSTEMS, METHODS AND COMPUTER PROGRAM PRODUCTS FOR SIGNATURE DETECTION

FIELD

The subject matter relates to signature detection.

BACKGROUND

A conventional in-process monitoring technique typically employs a two phase inspection procedure. During the first phase the surface of the wafer is inspected at high-speed and relatively low-resolution by e.g. an optical tool or an ebeam tool. The purpose of the first phase is to produce a defect map. For instance, the map may include an array database including X and Y coordinates for each defect (as well as other optional data such as defect type), but may also be otherwise arranged. The number of defects found in the first phase may be very high.

During the second phase only some of the defects found in the first phase may be reviewed, or in other words studied in detail (e.g. by SEM (Secondary Electron Microscope)), and therefore only a small sample of these defects may be selected. Both phases may be implemented by separate tools or by the same tool. A tool for (first phase) inspection and/or for (second phase) review may have a single detector or multiple detectors. Multiple detector two phase inspection devices are described, by way of example, in U.S. Pat. Nos. 5,699,447, 5,982,921, and 6,178,257 whose contents are hereby incorporated herein by reference.

Commonly, the detection of defects is facilitated by comparing measured results, e.g. an image, generated during inspection, with a reference, e.g. on a pixel-to-pixel basis. According to known methods, the reference may be measured results (e.g. images) of a previously measured die ("D2D"—Die to Die techniques), an area in the same die ("C2C"—Cell to Cell techniques), or a statistically generated model based on previously measured data or design data.

In many situations, only a small fraction of the defects detected in the first phase may be reviewed in the second phase (e.g. out of tens of thousands of defects found on a wafer in an optic inspection, less than a hundred may be transferred to a review by a scanning electron microscope (SEM)).

The group of defects which is selected for review is usually selected in order to represent a larger group of defects, based on various characteristics of the defects. For example, the selection may include selecting defects from different parts of the wafer, of different defect type, and so on.

It is noted that a single physical occurrence (e.g. a scratch on the surface of the wafer, uneven polishing of the wafer surface, etc.) may cause thousands of detectable defects. Such a physical occurrence may result in a disproportionately high number of defects (e.g. thousands of defects may result from a single scratch, out of about ten thousand defects in an example wafer). An effective sample of defects selected for review would include just one or a few of these thousands of defects, in order to free more resources for the detailed study of defects resulting from other causes.

SUMMARY

In accordance with some embodiments of the presently disclosed subject matter, there is provided a system for signature detection, comprising a processor which comprises: a density module configured to acquire an article defect density map comprising a plurality of sections corresponding to a first resolution level which is indicative of defect numbers for the sections, and to determine a distribution representative of the defect numbers or function thereof; a threshold module configured to determine a threshold in accordance with the distribution, and to identify sections, out of the plurality of sections in the article defect density map, with defect numbers or function thereof above the threshold; and a clustering module configured to cluster at least part of adjoining identified sections, into one or more signatures, and thus configured to detect the one or more signatures.

In accordance with some embodiments of the system, the density module being configured to acquire the article defect density map includes: being configured to acquire an article defect map, to divide at least part of the article defect map into the plurality of sections corresponding to the first resolution level, and to count defects in each of the sections, thereby giving rise to the defect numbers for the sections.

In accordance with some embodiments of the system, the density module being configured to acquire the article defect density map includes: being configured to acquire an article defect map, to divide at least part of the article defect map into the plurality of sections corresponding to the first resolution level, to count defects in each of the sections, to acquire a scanned portion map, and for at least one of the sections to use the scanned portion map to normalize the count by one or more of: scanned portion of the section or size of the section, thereby giving rise to the defect numbers for the sections.

In accordance with some embodiments of the system, the plurality of sections is defined by polar coordinates.

In accordance with some embodiments of the system, the system is configured for each of one or more other resolution levels to acquire an article defect density map comprising a plurality of sections corresponding to the other resolution level, to determine a distribution, to determine a threshold, to identify sections, and to cluster into one or more signatures, and thus to detect the one or more signatures for the other resolution level, the system further comprising: a unifying module configured to unify at least part of overlapping detected signatures from a plurality of resolution levels.

In accordance with some embodiments of the system, the system is configured to detect at least one polar signature using at least one article defect density map, each comprising a plurality of sections defined by polar coordinates corresponding to a respective resolution level, and to detect at least one Cartesian signature using at least one article defect density map, each comprising a plurality of sections defined by Cartesian coordinates corresponding to a respective resolution level, the system further comprising: a combining module configured to combine at least part of at least one detected Cartesian signature and at least part of at least one detected polar signature into a combined detected signature. In accordance with some of these embodiments, for a detected Cartesian signature and a detected polar signature with at least one defect in common, the combining module is configured to determine whether or not to combine at least part of the detected signature and at least part of the polar signature, depending on a result of at least one test, wherein the at least one test includes one or more of: a radius test indicative of a relationship between an average radius for defects in the detected Cartesian signature and inner and outer radial limits of the detected polar signature, or a density test indicative of a relationship between a density of the detected Cartesian signature and a density of the detected polar signature.

In accordance with some embodiments of the system, each at least one of the one or more detected signatures, is graded with a grade that is at least partly dependent on the threshold.

In accordance with some embodiments of the system the system further comprises: an organizing module configured to perform, for a detected signature which includes at least part of at least one of the one or more detected signatures, any of a group of actions, the group including: characterizing, filtering, or separating at least partly by at least one of: radius, angle, density, area, grade, number of defects, ratio of number of defects, resolution gap, detection procedure, type, number of sections, defect locations, superclusters, interest real defects, nuisances, or false alarms.

In accordance with some embodiments of the system, the article density map is a density map for an article which is at least one of: round, or has a perimeter that is at least partly curved.

In accordance with some embodiments of the presently disclosed subject matter, there is provided a method of signature detection, comprising: acquiring an article defect density map comprising a plurality of sections corresponding to a first resolution level which is indicative of defect numbers for the sections, and determining a distribution representative of the defect numbers or function thereof; determining a threshold in accordance with the distribution, and identifying sections, out of the plurality of sections in the article defect density map, with defect numbers or function thereof above the threshold; and clustering at least part of adjoining identified sections, into one or more signatures, thus detecting the one or more signatures.

In accordance with some embodiments of the method, the acquiring the article defect density map includes: acquiring an article defect map, dividing at least part of the article defect map into the plurality of sections corresponding to the first resolution level, and counting defects in each of the sections, thereby giving rise to the defect numbers for the sections.

In accordance with some embodiments of the method, wherein the acquiring the article defect density map includes: acquiring an article defect map, dividing at least part of the article defect map into the plurality of sections corresponding to the first resolution level, counting defects in each of the sections, acquiring a scanned portion map, and for at least one of the sections using the scanned portion map to normalize the count by one or more of: scanned portion of the section, or size of the section, thereby giving rise to the defect numbers for the sections.

In accordance with some embodiments of the method, the plurality of sections is defined by polar coordinates.

In accordance with some embodiments of the method, the method comprises for each of one or more other resolution levels: acquiring an article defect density map comprising a plurality of sections corresponding to the other resolution level, determining a distribution, determining a threshold, identifying sections, and clustering into one or more signatures, thus detecting the one or more signatures for the other resolution level, the method further comprising: unifying at least part of overlapping detected signatures from a plurality of resolution levels.

In accordance with some embodiments of the method, the method comprises: detecting at least one polar signature using at least one article defect density map, each comprising a plurality of sections defined by polar coordinates corresponding to a respective resolution level, and detecting at least one Cartesian signature using at least one article defect density map, each comprising a plurality of sections defined by Cartesian coordinates corresponding to a respective resolution level, the method further comprising: combining at least part of at least one detected Cartesian signature and at least part of at least one detected polar signature into a combined detected signature.

In accordance with some embodiments of the method, each at least one of the one or more detected signatures, is graded with a grade that is at least partly dependent on the threshold.

In accordance with some embodiments of the method, the method further comprises: performing for a detected signature which includes at least part of at least one of the one or more detected signatures, any of a group of actions, the group including: characterizing, filtering, or separating at least partly by at least one of: radius, angle, density, area, grade, number of defects, ratio of number of defects, resolution gap, detection procedure, type, number of sections, defect locations, superclusters, interest, real defects, nuisances, or false alarms.

In accordance with some embodiments of the presently disclosed subject matter, there is provided a computer program product comprising a computer useable medium having computer readable code embodied therein for signature detection, the computer program product comprising: computer readable program code for causing a computer to acquire an article defect density map comprising a plurality of sections corresponding to a first resolution level which is indicative of defect numbers for the sections, and to determine a distribution representative of the defect numbers or function thereof; computer readable program code for causing a computer to determine a threshold in accordance with the distribution, and to identify sections, out of the plurality of sections in the article defect density map, with defect numbers or function thereof above the threshold; and computer readable program code for causing a computer to cluster at least part of adjoining identified sections, into one or more signatures, and thus to detect the one or more signatures.

In accordance with some embodiments of the computer program product, the plurality of sections is defined by polar coordinates.

BRIEF DESCRIPTION OF THE DRAWINGS

In order to understand the subject matter and to see how it may be carried out in practice, embodiments will now be described, by way of example only, with reference to the accompanying drawings, in which.

Figure 1:
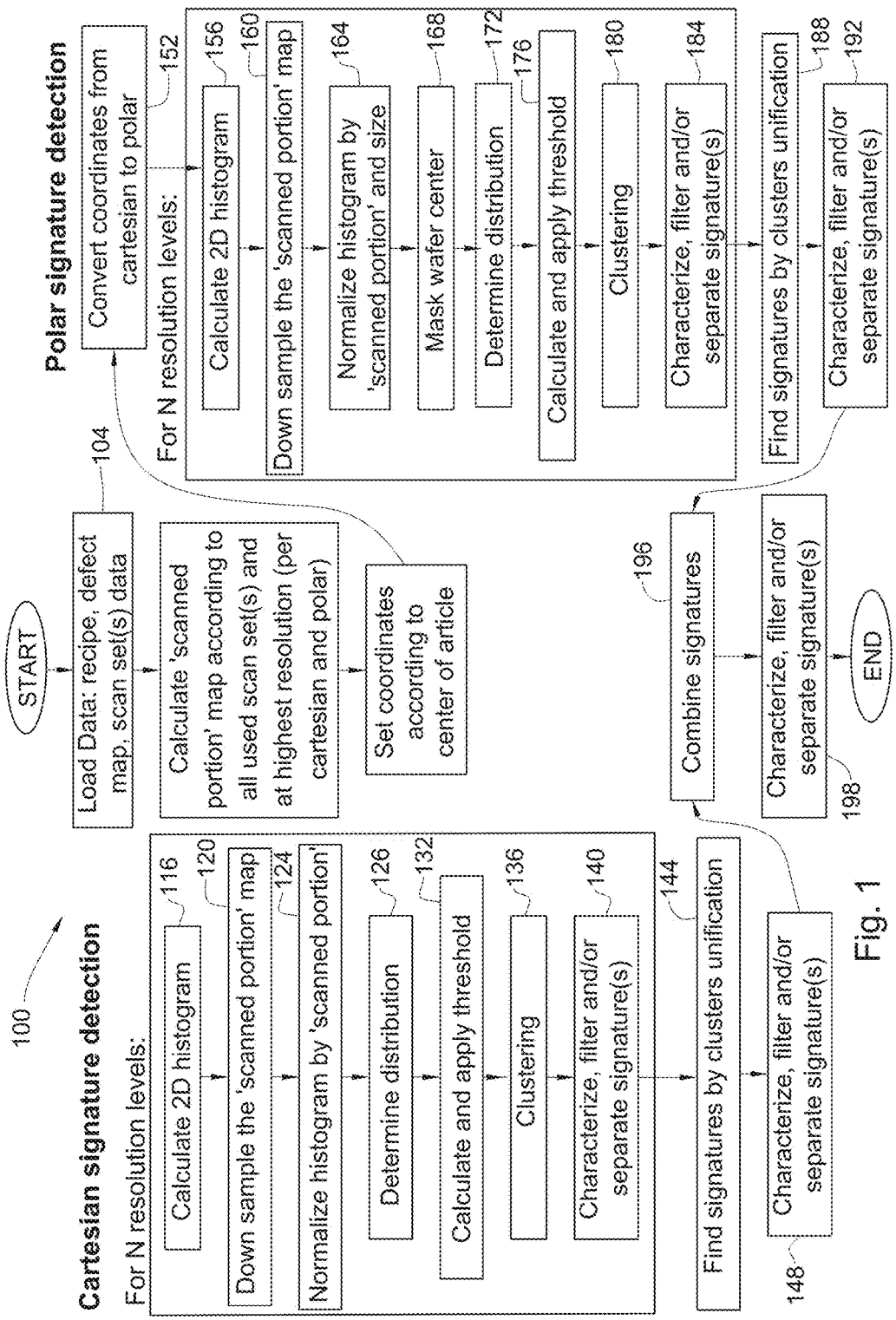
FIG. 1 is a flowchart of a method of signature detection, in accordance with some embodiments of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate the same or analogous elements.

DETAILED DESCRIPTION OF EMBODIMENTS

In the following detailed description, numerous specific details are set forth in order to provide a thorough understanding of the subject matter. However, it will be understood by those skilled in the art that the subject matter may be practiced without these specific details. In other instances, well-known methods, stages, elements, modules, and/or systems have not been described in detail so as not to obscure the subject matter.

Terms such as "processing", "calculating", "determining", "acquiring", "setting", "identifying", "selecting", "defining", "computing", "detecting", "clustering", "dividing", "counting", "using", "normalizing", "unifying", "applying", "merging", "combining", "enabling", "grading", "organizing", "performing", "characterizing", "filtering", "separating", "downsampling", "upsampling", "finding", "loading", "converting", "masking", or the like, may refer to the action(s) and/or process(es) of any combination of software, hardware and/or firmware. For instance, such term(s) may refer in some cases to action(s) and/or process(es) of an electronic device with data processing capabilities that manipulates and/or transforms data into other data, the data represented as physical quantities, e.g. electronic quantities, and/or the data representing the physical objects. In these cases, the operations in accordance with the teachings herein may be performed by an electronic device with data processing capabilities specially constructed for the desired purposes or by a general purpose electronic device with data processing capabilities specially configured for the desired purpose by a computer program stored in a computer readable storage medium. Terms such as "computer", "processor", "processing module", "processing unit", "machine", and the like should be expansively construed to cover any kind of electronic device with data processing capabilities (whether analog, digital or a combination), including, by way of example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and/or any combination thereof.

Usage of the term "typically although not necessarily", "although not necessarily so", "one embodiment", "some embodiments" another embodiment", other embodiments", "some of these embodiments", "various embodiments", "embodiment", "embodiments", "for example," "such as", "for instance", "e.g.", "possibly", "it is possible", "optionally", "one example", "some examples", "another example", "other examples, "various examples", "example", "examples", "one instance", "some instances", "another instance", "other instances", "instance", "instances", "case", "cases", "some cases", "these cases", "other cases", "former case", "latter case", or variants thereof means that a particular described method, stage, element, module, and/or system is included in at least one non-limiting embodiment of the subject matter, but not necessarily in all embodiments. The appearance of the same term does not necessarily refer to the same embodiments(s).

Usage of conditional language, such as "may", "can", "could", or variants thereof is intended to convey that one or more embodiments of the subject matter may include, while one or more other embodiments of the subject matter may not necessarily include, certain methods, stages, elements, modules, and/or systems. Thus such conditional language is not generally intended to imply that a particular described method, stage, element, module, or system is necessarily included in all embodiments of the subject matter. Moreover, non-usage of conditional language is not generally intended to imply that a particular described method, stage, element, module, or system is necessarily included in all embodiments of the subject matter.

The term "non-transitory" is used to exclude transitory, propagating signals, but to otherwise include any volatile or non-volatile computer memory technology suitable to the application.

It is appreciated that certain methods, stages, elements, modules, and/or systems of the presently disclosed subject matter, which are, for clarity, described in the context of separate embodiments, may also be provided in combination in a single embodiment. Conversely, various methods, stages, elements, modules, and/or systems of the presently disclosed subject matter, which are, for brevity, described in the context of a single embodiment, may also be provided separately or in any suitable sub-combination.

The presently disclosed subject matter provides systems, methods and computer program products for signature detection. While the subject matter is described with reference to two dimensions, it should be understood that it may also be used for three dimensions, mutatis mutandis. For instance a three dimensional defect map may be obtained by analyzing defects found in several layers of a wafer. In the following description, the example of a wafer is used predominantly. However it should be understood that this example is used for simplicity's sake, and that the disclosed systems and method may be used for analysis in a wide range of articles (e.g. electronic circuit, wafer, reticle, photomask, fabric, petri dish, a solar cell, a part of any of the above, and so on). The article may be measurable by any scale, from a very minute scale (e.g. millimetric or nanonmetric) to a larger scale for a larger article (e.g. a geographical sector imaged from an airplane or satellite).

The term defect is used herein to connote a location on the article which is flagged on a defect map. The location may be flagged as a defect for any reason. For instance, the location may be flagged because the location includes a real defect, e.g. an undesirable local change that may render the article inoperable (e.g. if it is an electric chip) or affect its reliability. Additionally or alternatively, for instance, the location may be flagged because the location includes a "nuisance", e.g. a local change which does not affect operability or reliability of the article. Additionally or alternatively, for instance, the location may be flagged due to an apparent "false alarm", e.g. a problem with the inspection system.

Locations on the article may be flagged as defects in accordance with any suitable procedure, which is not limited by the currently disclosed subject matter. For instance, as described above, it is possible that one or more inspection images which were generated by collecting signals may be analyzed. A location on the article may be flagged as a defect if a measured value of a pixel ("certain pixel") in an inspection image of the article, corresponding to that location, is too different from a respective reference value, but this is not necessarily so. According to some methods, the respective reference value may be based on one or more measured value(s) of pixel(s) associated with other die(s) than the die associated with the certain pixel ("D2D"—Die to Die techniques), may be based on one or more measured value(s) of pixel(s) associated with the same die as the die associated with the certain pixel ("C2C"—Cell to Cell techniques), and/or may be a statistically generated value based on previously measured data and/or design data, etc. "Too different" may be determined in any manner. For instance, in some cases, too different may be implied if the absolute difference between a value associated with a pixel of the inspection image and a respective reference value is greater than a respective maximum value, where the respective maximum may be the same for all pixels or may vary for different pixels. However in other cases, too different may be implied by any other appropriate relationship between values.

Generally, defect density differences across an article such as a wafer may be enormous, ranging from regions with none or few defects per unit area to regions with very many defects per unit area. The regions on an article where defects are irregularly dense are termed "signatures". Defect density may be varied along a signature, but even so, the density throughout the signature may be above certain floor(s) which may vary depending on the article (relative density), and/or may be set (absolute density). A signature may be characterized by its density (relative and/or absolute), by its spatial shape (or lack thereof—e.g. amorphous) and/or by any other characteristic.

In many situations, only a small fraction of the defects detected in the first phase may be reviewed in the second phase. It may therefore be desirable to review defects from different independent signatures. For instance, assume that any one signature may include defects caused by one or more event(s). Further assume that two signatures may be considered to be independent if each one is more likely than not to include defects resulting from event(s) that are independent of the event(s) which caused the defects in the other signature. For example, with wafers, possible event(s) may include, inter-alia:

a. Wafer contamination/scratch (which may cause real defects)
   b. Instability in CD printing: stepper/mask issue (which may cause real defects and/or nuisances)
   c. Irregularity in wafer polish (which may cause real defects and/or nuisances)
   d. Defocus aberration at a specific region of the wafer (which may cause false alarms)
   e. Partial dies (which may cause false alarms).

Signature detection will now be described in accordance with some embodiments. Although not necessarily so, in some embodiments signature detection may be performed after the first inspection phase, but before the second (review) inspection phase.

FIG. 1 is a flowchart of a method 100 of signature detection, in accordance with some embodiments of the presently disclosed subject matter.

As will be understood from embodiments described herein, reference to a detected signature may refer to a signature at any stage of and/or at the end of method 100. For instance, detected signatures may be merged, filtered out, and/or separated, etc, during method 100, thereby changing the number of detected signatures and/or redefining which defects are considered to be part of a given detected signature, as method 100 advances. Therefore it is possible, for instance, that a signature, as detected at a certain stage of or at the end of method 100, may at least include at least part of at least one detected signature associated with an earlier stage of method 100. In this instance, a signature, as detected at a certain stage or at the end, may or may not have been the same signature earlier on in method 100. Merging in method 100 may accomplish one or more functions, such as merging non-independent signatures (likely due to the same event(s)), enabling the detection of as many defects as possible which should be included in the signature, etc. For ease of understanding of the reader, the term "combining" is used herein to refer to merging with respect to different coordinate systems and the term "unifying" is used herein to refer to merging with respect to different resolution levels.

When discussing the counting of defects herein, for instance with reference to a section, not necessarily all defects may be counted in all embodiments. For example, superclusters (meaning defects very close to one another) may be counted only once in some embodiments, etc. Therefore the count may not necessarily be a strict count (meaning where all defects, for instance in a section, are counted), and should be construed to include both embodiments where the count is strict and embodiments where the count is not strict (meaning where not all defects, for instance in a section, are necessarily counted).

In stage 104, data may be acquired. The acquired data may include for example, the recipe which will be used for detecting signature(s), data used for one or more scan set(s) indicating, at least, what was actually scanned on the article for each scan set, and/or a map of defects on the article ("article defect map" or equivalently "defect map") generated based on the one or more scan set(s). For instance, the one or more scan sets may be associated with the first inspection phase.

The article defect map may include, for instance, the defects' coordinates and/or indices (also known as identifiers), thereby facilitating reference to defects. The defect map may additionally or alternatively include other information, such as defect type. The defects' coordinates may be associated with a certain coordinate system (e.g. Cartesian, polar, etc), as the coordinates may be converted to a different coordinate system if and when necessary. Additionally or alternatively, there may be different article defect maps (e.g. two) each associated with a different coordinate system (e.g. Cartesian, polar), and/or there may be an article defect map which includes different sets of coordinates (e.g. two) each associated with a different coordinate system (e.g. Cartesian, polar). The information in the article defect map may be arranged, for instance in an array database, or may, for instance, be otherwise arranged.

Figure 2:
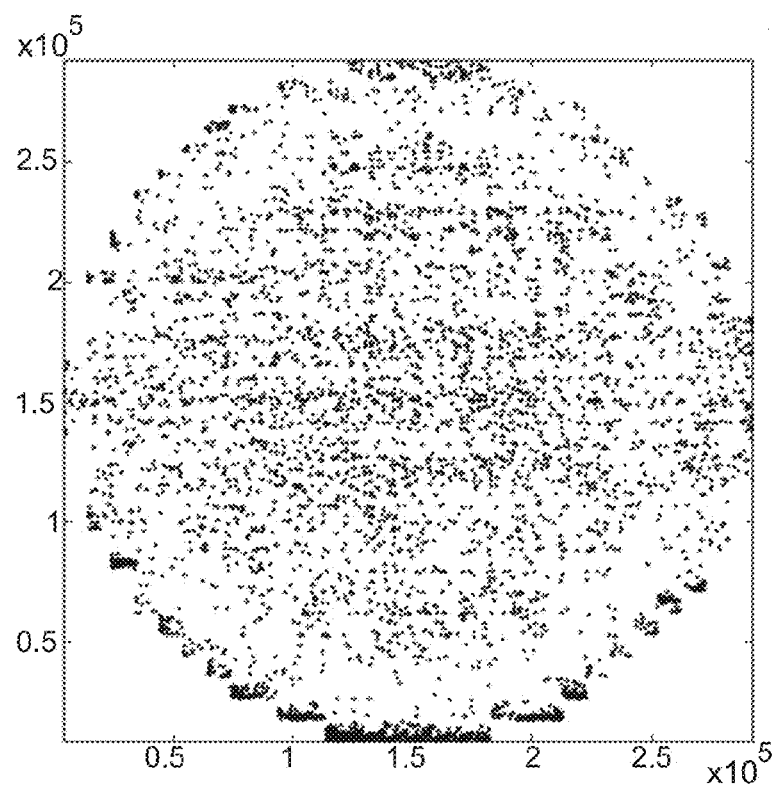
FIG. 2 illustrates an article defect map, in accordance with some embodiments of the presently disclosed subject matter.

FIG. 2 illustrates an article defect map, in accordance with some embodiments of the presently disclosed subject matter.

In optional stage 108, a scanned portion map may be determined at least partly based on the data used for the one or more scan set(s). For simplicity's sake it may be assumed that a scanned portion map is determined for the highest resolution, and if there is more than one resolution, then the scanned portion map may be down-sampled for the lower resolution(s). It is noted that if more than one coordinate system (e.g. polar and Cartesian) will be used in method 100, the resolution levels for the different coordinate systems (e.g. including the highest resolution for each) may not necessarily coincide and possibly the scanned portion map may be determined for the highest resolution among all resolution levels of polar and Cartesian and then down-sampled for all other resolutions. However, it should be evident, that if there are multiple resolutions, multiple corresponding scanned portion maps may additionally or alternatively be individually determined in the manner which will now be described.

Assume for instance, that in accordance with a certain resolution (e.g. highest resolution), at least part of the defect map may be divided into a plurality of sections. This plurality of sections may correspond to the sections comprised in the defect density map of that resolution (to be described below) which are not masked in the defect density map. However, if only part of the defect map is divided into the plurality of sections corresponding to those in the defect density map which are not masked, optionally the remainder of the defect map may be divided into one or more "trivial" sections, where a "trivial" section is one which is masked in the defect density map (e.g. see discussion below regarding polar coordinates and meaning of masking). For simplicity's sake, unless the term "trivial section" is used, it should be assumed that the term "section" when used herein refers to a section which is not masked in the defect density map. The plurality of sections into which the at least part of the defect map is divided may or may not be the same size. In some embodiments, for Cartesian coordinates the sections may be the same size, but for polar coordinates not all the sections may necessarily be the same size with the size varying along the radius.

Figure 3:
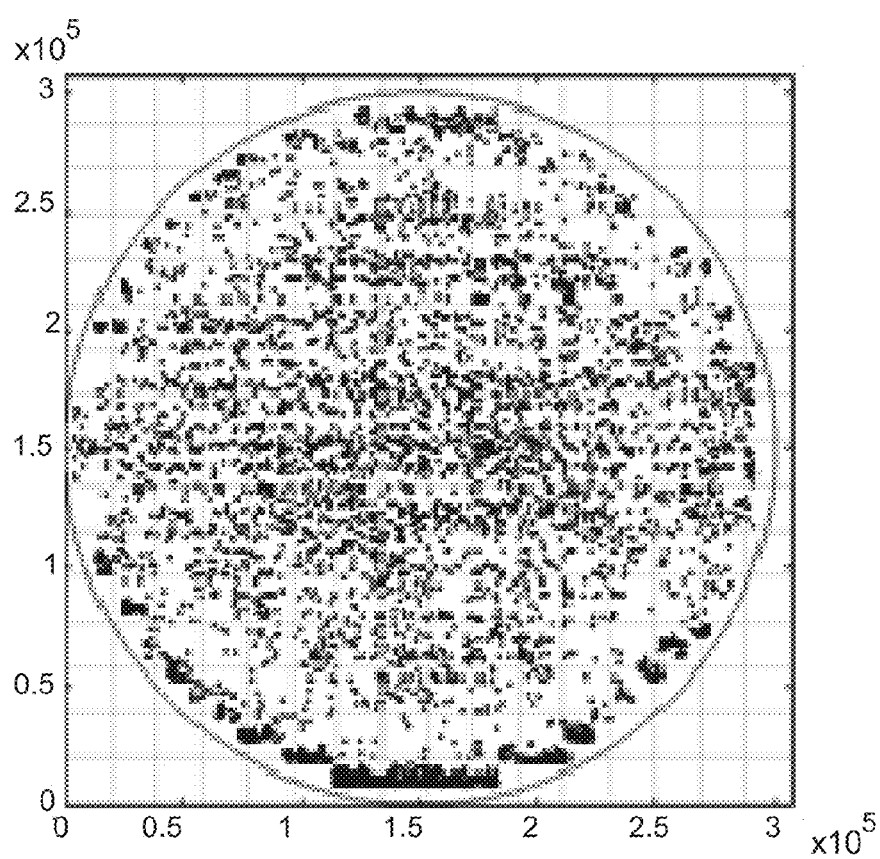
FIG. 3 illustrates an article defect map divided into sections defined by Cartesian coordinates and corresponding to a certain resolution, in accordance with some embodiments of the presently disclosed subject matter.

FIG. 3 illustrates an article defect map divided into sections corresponding to a certain resolution, in accordance with some embodiments of the presently disclosed subject matter. In this figure, the sections are delineated by vertical and horizontal grid lines and therefore are defined by Cartesian coordinates.

Determining a scanned portion map in stage 108 may include indicating for each of the plurality of sections the actual scanned portion of the section, or in other words the actual portion which was scanned of the section. The actual scanned portion of the section may be expressed e.g. as a percentage or fraction. As mentioned above, the actual scanned portion of a section may be based at least partly on the data used in the one or more scan set(s)). For instance, if there is a plurality of scan sets, a possible procedure may indicate a scanned portion value of zero, or in other words indicate that the section was not scanned at all, only if the section was not actually scanned at all for any of the scan sets. Additionally or alternatively, determining a scanned portion map in stage 108 may include indicating the different section sizes, for instance if the section sizes vary among the plurality of sections.

If both Cartesian and polar coordinates will be used in method 100, then for each type of coordinates, scanned portion map(s) may be determined at least partly based on scan set(s) data in stage 108, or scanned portion map(s) may be determined at least partly based on scan set(s) data for only one type of coordinates (e.g. Cartesian coordinates). In the latter case, a scanned portion map determined for this type of coordinates may be converted (e.g. at this stage or later) into a scanned portion map for the other type of coordinates (e.g. polar) as will be described further below.

Figure 4:
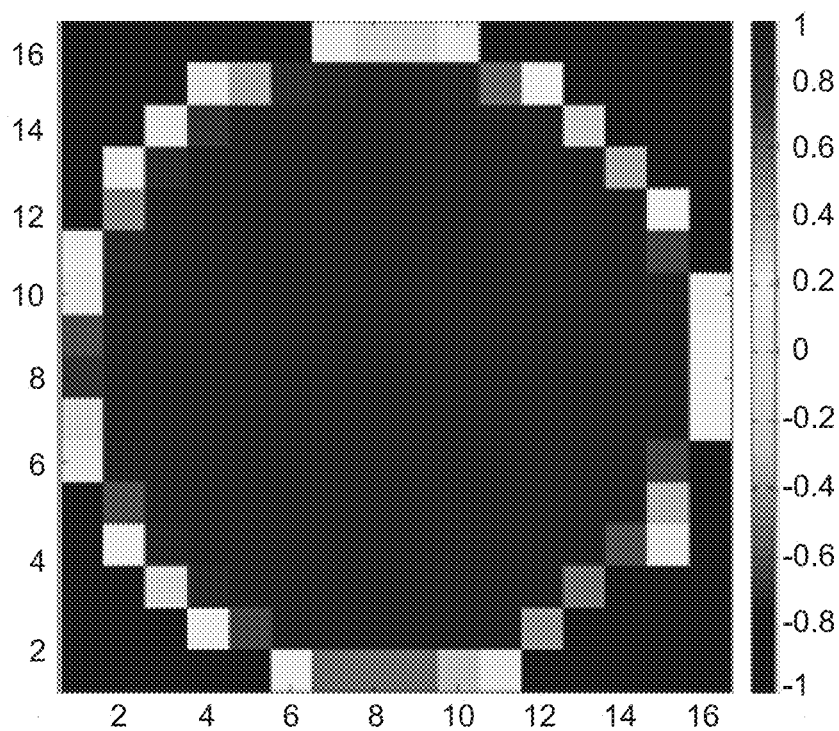
FIG. 4 illustrates a scanned portion map which indicates the scanned portion of each section in FIG. 3, in accordance with some embodiments of the presently disclosed subject matter.

FIG. 4 illustrates a scanned portion map which indicates the scanned portion of each section in FIG. 3, in accordance with some embodiments of the presently disclosed subject matter. In this illustration, different shading is used to indicate the actual scanned portions, for instance with the darkest shading indicating that the entire section was actually scanned.

In optional stage 112, the coordinates may be set to the center of the article. In some embodiments, this stage may be omitted if signatures will be detected using only Cartesian coordinates. In some embodiments, additionally or alternatively, this stage may be performed if the article is round and/or has a perimeter which is at least partly curved.

In the embodiments illustrated by FIG. 1 it is assumed that the method includes detection of signatures using Cartesian and polar coordinates. However in other embodiments, detection of signatures using only Cartesian or only polar coordinates may be performed.

The description will begin (arbitrarily) with Cartesian coordinates. For N (N≥1) resolution levels, the following procedure may be performed. N may be nine or any larger or smaller number greater than or equal to one. If N>1, the procedure may be performed for the resolution levels in any order. Typically although not necessarily, more sections correspond to a higher resolution level than to a lower resolution level.

Beginning with a first resolution level, an article defect density map, comprising a plurality of sections corresponding to the current resolution level which is indicative of defect numbers for the sections, may be acquired. As explained above, the article defect density map may optionally also include "trivial" sections, in addition to these sections. The subject matter does not limit how the article density map may be acquired, however for the purpose of illustration, some examples are now provided. Assume that in accordance with a current resolution level, at least part of the defect map acquired in stage 104 may be divided into the plurality of sections. These sections may be defined by Cartesian coordinates. Typically although not necessarily, these sections may be square and of the same size. (For simplicity's sake it is assumed that the acquired article defect map used Cartesian coordinates for the defects and therefore coordinate conversion is not required).

Acquiring the defect density map may therefore include, for example, dividing at least part of an acquired article defect map into the plurality of sections corresponding to the current resolution level and determining the defect numbers for these sections. For instance, the defect numbers for these sections may be determined by counting defects in each section. Additionally or alternatively, for instance, the defect numbers for these sections may be determined by counting defects in each section and then (for at least one of the sections) normalizing the count, using an acquired scanned portion map. Therefore, the defect number for any section may be determined by counting defects in that section, and optionally normalizing the count using an acquired scanned portion map. Normalizing the count may include normalizing by scanned portion of the section (which may be an actual scanned portion of the section or an estimated scanned portion of the section) and/or normalizing by size of the section. For instance, normalization by size may be performed if not all sections in the defect density map are necessarily the same size.

The defect number for a section in the article defect density map may be indicative of defect density for that section. However, the manner of determining defect numbers may vary depending on the embodiment. If the area of each section in the current resolution level may be considered equivalent with regard to density, then the count of defects in each section may be used as an effective substitute for defect density. Additionally or alternatively, normalization of the count may be performed, for instance when the count alone may not be considered an appropriate substitute for defect density due to variation in what should be considered the area for various sections in the current resolution level with regard to density (e.g. due to varying scanned portion, varying size, etc).

The acquiring of the scanned portion map which may be used for normalizing may have included performing stage 108, downsampling and/or upsampling. (For simplicity's sake it is assumed herein below that the scanned portion map was determined in stage 108 in Cartesian coordinates and therefore does not need to be converted to Cartesian coordinates, but in other embodiments conversion to Cartesian coordinates may take place). For instance the acquired scanned portion map which may be used for normalizing may be a scanned portion map which was determined in stage 108, a scanned portion map which was computed by down-sampling a scanned portion map determined in stage 108 for a higher resolution, or a scanned portion map which was computed by up-sampling a scanned portion map which was determined in stage 108 for a lower resolution. In the case of downsampling, a scanned portion map for a higher resolution may be downsampled by, for instance, averaging the scanned portions of the various sections (e.g. fractions, percentages) in the higher resolution which are included in a lower resolution section in order to derive an estimated scanned portion (e.g. fraction, percentage) for the lower resolution section, and/or by summing up the sizes of the various sections in the higher resolution which are included in the lower resolution section in order to determine a size for the lower resolution section. In the case of up-sampling, a scanned portion map for a lower resolution may be upsampled by, for instance, estimating that the same scanned portion of the section in the lower resolution would also apply to a higher resolution section included in the lower resolution section, and/or by dividing the size of the section in the lower resolution which includes the higher resolution section by the ratio of resolutions (=higher/lower) in order to determine the size of the lower resolution section.

Optionally, a scanned portion map may indicate a scanned portion value of zero for any section where the scanned portion of the section is less than a minimum value. Optionally a scanned portion map may indicate scanned portion and/or section size for one or more trivial sections. Depending on the embodiment, a scanned portion map may include a single map or a plurality of maps. In the former case, for instance, size and/or scanned portion, etc. may be indicated on the map. In the latter case, for instance, one of the plurality of maps may be indicative of size of section, another indicative of scanned portion of section, etc.

It is noted that if there are trivial sections, then optionally the defect number(s) for one or more of these trivial sections may be determined, for instance in order to harmonize implementation, even though these trivial sections may be masked in the defect density map. For simplicity's sake, it is assumed in the remainder of the discussion that there are no "trivial" sections for Cartesian coordinates, even though there may optionally be.

Figure 5:
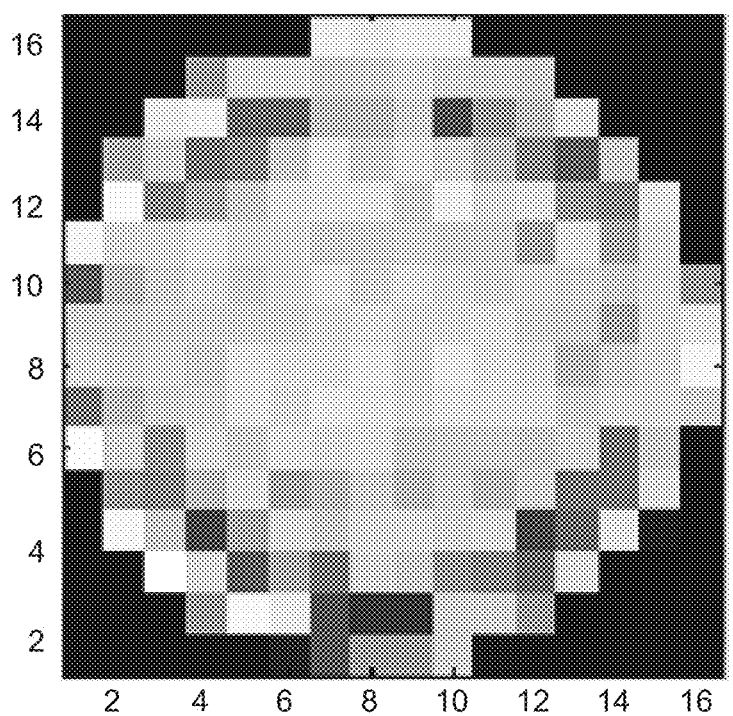
FIG. 5 illustrates an article defect density map, in accordance with some embodiments of the presently disclosed subject matter.

FIG. 5 illustrates an article defect density map, in accordance with some embodiments of the presently disclosed subject matter. The defect density map illustrated in FIG. 5 may have been acquired, for instance, by counting the defects in each section in the defect map illustrated in FIG. 3 and then for each section, normalizing the count by the scanned portion of the section as illustrated in FIG. 4.

Referring again to FIG. 1, FIG. 1 illustrates embodiments where in stage 116, the defects in the plurality of sections may be counted (referred to as a two-dimensional histogram), where in stage 120, a scanned portion map determined in stage 108 may be downsampled if the current resolution is lower than the resolution of the scanned portion map, and where in stage 124, for at least one of the plurality of sections, the count may be normalized by the scanned portion of the section, using the (possibly downsampled) scanned portion map. As explained herein, embodiments which differ from those illustrated in FIG. 1 may be additionally or alternatively implemented.

In stage 128, a distribution representative of the defect numbers or function thereof (or in other words representative of a function of the defect numbers) may be determined. The distribution may be considered representative of the defect numbers or function thereof, even if the distribution does not take into account the defect numbers for all of the plurality of sections. For example, there may be cases where the defect number(s) of particular section(s) may be ignored. Continuing with this example, optionally, the number of defects in any section corresponding to a zero scanned value in the scanned portion map (e.g. none of the sections was actually scanned or estimated to have been scanned) may be ignored when determining the distribution. For instance, the number of defects in any section corresponding to a zero scanned value in the scanned portion map may be ignored, if normalization for a scanned portion map did not take place. Continuing with this example, additionally or alternatively, optionally sections with a defect number equal to zero may be ignored when determining the distribution. For instance, if there is no scanned portion map, it may be assumed, (possibly erroneously) that sections with a defect number equal to zero were not scanned.

Any type of distribution may be used to represent the defect numbers or function thereof. In some embodiments, the distribution may be a histogram (e.g. a one dimensional histogram) or a function of a histogram. For instance, if a histogram is used or a function thereof, the horizontal axis may show discrete bins representative of defect numbers or function thereof. The vertical axis may indicate the number of sections. Therefore for each bin, the height of a rectangle at that bin may be indicative of the number of sections corresponding to that bin. (If the number of corresponding sections is zero, the bin may be considered non-active. In this case because the height would be zero, the rectangle may optionally be omitted). Optionally, if the number of corresponding section(s) is lower than a certain minimum, the value for the number of section(s) may be set to zero. Each bin along the horizontal axis, for instance, may be higher by one unit from the bin on the left thereof (meaning the bin size would be one unit). Additionally or alternatively, for instance, a function may be applied in cases where the histogram would otherwise be sparse, due to few active bins, such as multiplying the bin size (e.g. initially set to one unit) by a multiplier (e.g. larger than 1) so as to cause the bin size in the histogram to be greater than one unit. Such a function may be applied iteratively until the histogram is no longer considered sparse. If the distribution is a function of the histogram, the function may be any function. For instance, the distribution may be a histogram smoothed by convolution with a smooth kernel. Additionally or alternatively, the distribution may be a natural log of the histogram or of a smoothed histogram (e.g. where values on the vertical axis=natural log of (numbers of section(s)+1) where the "1" or any other small number may be added to the number of sections so as to not result in an undefined value, in cases where the number of sections is zero).

In stage 132, a threshold in accordance with the distribution may be determined The threshold may be determined in any appropriate manner as long as the threshold is determined in accordance with the distribution.

For instance, the threshold may be determined by fitting to the distribution an approximation function out of a group of functions and setting the threshold as the point where the approximation function crosses the horizontal axis. The reader is referred to co-pending U.S. application Ser. No. 14/279,192 filed on May 15, 2014, which is hereby incorporated by reference. In that application, the distribution is not representative of the defect numbers or function thereof but rather of comparison values. However similar ways of determining an approximation function described in the co-pending application may be used in some embodiments of the presently disclosed subject matter, mutatis mutandis. Each approximation function in the group of approximation functions used in some embodiments of the presently disclosed subject matter, may or may not be a parabola function or a composition of a parabola function and a line parallel to the horizontal axis. For simplicity's sake, a vertical (dependent) variable will be referred to as "y", and a horizontal (independent) variable as "x". Assuming embodiments with a composition of a parabola function and a line parallel to the horizontal axis, the various approximation functions in the group may therefore each be expressed as a composition of a parabola function $y=ax^2+bx+c$ and a line parallel to the horizontal axis (y=constant), where "a", "b" and "c" and the constant for the line parallel to the horizontal axis may take on different values for different approximation functions in the group. In this example, "b" may or may not be set to zero for all approximation functions in the group.

It is noted that despite the usage of terms such as axis, rectangle, etc. in order to ease the understanding of the reader, it may not be necessary to plot the distribution and/or approximation function(s).

When fitting to the distribution is performed, the fitting may be carried out in some cases, by minimizing an error estimation function, which is based on the errors (differences) between the distribution data and the approximation function. The error estimation function may be a least mean squared (LMS) function, and/or any other known statistical method. For instance, for each defect number or function thereof ($N_i$) up to the highest defect number or function thereof for which there is an actual associated distribution value (e.g. number of sections, any of the other examples discussed above, etc.), the actual distribution value ($y_{actual,Ni}$) associated with $N_i$ may be subtracted from the estimation "$y_{estimation(Fj),Ni}$" value estimated by one of the approximation function ($F_j$) in the group for $N_i$. The results ($y_{estimation(Fj),Ni} - y_{actual,Ni}$) may be squared for each $N_i$, and then summed together. That is, the error (or score) for each approximation function Fj may be $\Sigma(y_{estimation(Fj),Ni} - y_{actual,Ni})^2$ where the summation is for all $N_i$. The approximation function Fj having the minimal score from the group may be selected in such an implementation. It should be clear to a person who is skilled in the art that not all possible approximation functions are necessarily analyzed for each distribution, and that various techniques are known in the art for fitting an approximation function to a distribution.

Additionally or alternatively, the fitting of the approximation function may in some cases include one or both of the following two aspects: applying a fitting which gives smaller weight to common defect number(s) or function thereof; and/or applying a fitting which gives smaller weight to defect number(s) or function thereof whose distance from an average defect number or function thereof is large. The reader is referred to the aforementioned U.S. application Ser. No. 14/279,192 where these aspects are described with respect to comparison values (rather than defect numbers or function thereof) for more details on possible embodiments, mutatis mutandis.

The group of approximation functions may or may not be predefined. Optionally, if the group of approximation functions is not predefined, there may be a selection stage where an appropriate group of approximation functions is selected from among various groups of approximation functions, in any suitable manner.

Figure 6:
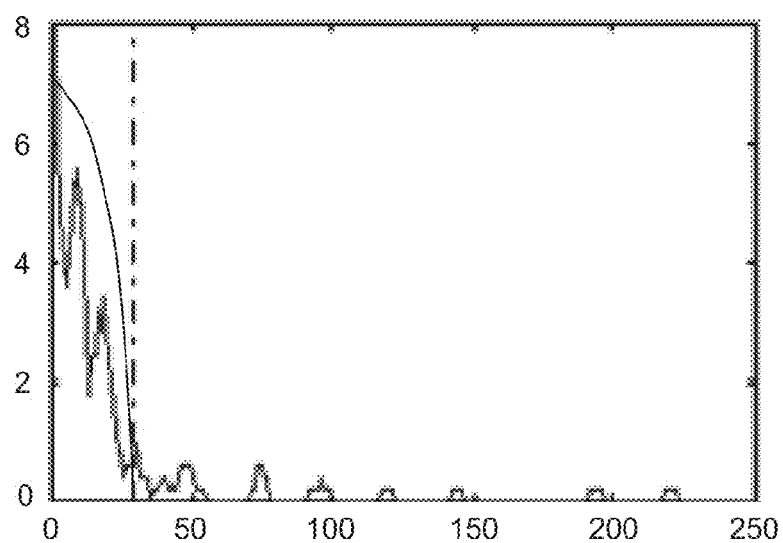
FIG. 6 illustrates a distribution representative of defect numbers, in accordance with some embodiments of the presently disclosed subject matter.

FIG. 6 illustrates a distribution representative of defect numbers, in accordance with some embodiments of the presently disclosed subject matter. In this figure which may be associated with a low resolution level defect density map, seven sections are shown as having zero defects. Other defect numbers each correspond to less than seven sections. A parabola is shown fitted to the distribution, and the horizontal axis crossing of the parabola is set as the threshold.

Continuing with stage 132, sections, out of the plurality of sections in the article defect density map, with defect numbers or function thereof above the threshold may be identified. For instance, sections with defect numbers or function thereof above the threshold may be considered suspiciously dense.

A threshold determined in accordance with a distribution may be advantageous in some instances when identifying sections, compared to a fixed threshold. For instance, a fixed threshold may be a threshold which is the same regardless of the resolution level. However, a lower number of defects in a section corresponding to a higher resolution level may be proportionately equivalent to a higher number of defects in a section corresponding to a lower resolution level. Therefore a fixed threshold which may be appropriate for a higher resolution level may in some cases lead to falsely identified sections corresponding to a lower resolution section, whereas a fixed threshold which may be appropriate for a lower resolution level may lead in some cases to non-identification of sections corresponding to a higher resolution level which maybe should have been identified. Additionally or alternatively, for instance, even if different fixed thresholds are set for different resolution levels, the fixed thresholds may not work in some cases as well as a threshold which is determined in accordance with the distribution (For example, the fixed thresholds may not work as well in some cases when relating to different articles (e.g. different wafers), different recipes, different scan sets, etc). In other instances, a threshold determined in accordance with a distribution may not necessarily be advantageous when identifying the sections.

Figure 7:
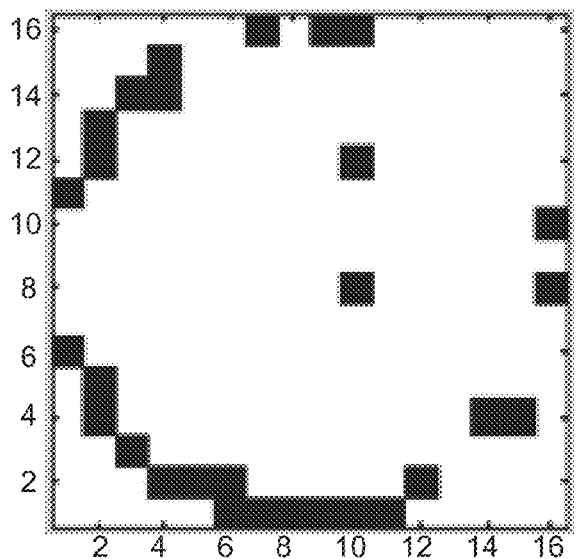
FIG. 7 illustrates identified sections in an article defect density map, in accordance with some embodiments of the presently disclosed subject matter.

FIG. 7 illustrates identified sections in an article defect density map, in accordance with some embodiments of the presently disclosed subject matter. Each section whose defect number is above the threshold is identifiable in FIG. 7. It should be evident that identifying sections may not necessarily include marking the sections in the manner shown in FIG. 7, or marking in any visible manner on the defect density map when performing method 100.

In stage 136, at least part of adjoining identified sections may be clustered into one or more signatures, thus detecting these signature(s). Each cluster may correspond to one (Cartesian) signature. For instance each cluster may include two or more adjoining identified sections. The sections in a signature may also be referred to as "clustered sections". A Cartesian signature may also be referred to as a "local" signature.

It is noted that the term "adjoining sections" or "adjoining identified sections" refers to sections whose coordinates would mean that the sections would be adjoining on the article defect map. Depending on the form of the defect density map, these sections may or may not be actually adjoining on the defect density map. An example of the latter will be discussed further below with reference to polar coordinates.

Depending on the clustering rule used in a particular embodiment, all adjoining identified sections may be clustered, or not necessarily all adjoining identified sections may be clustered. In some embodiments of adjoining identified sections, an identified section with a side touching a side of another identified section may be clustered with the other identified section. This would mean that for a given section, up to four other adjoining sections may join the cluster because of touching the given section. In other embodiments of adjoining identified sections, an identified section with a corner touching a corner of another identified section may be clustered with the other identified section. This would mean that for a given section, up to eight other adjoining sections may join the cluster because of touching the given section. It is noted that if a side touches a side, then necessarily a corner also touches a corner.

Each cluster may be independent. This means, that if there is a plurality of clusters, sections that are in different clusters would not have been clustered together based on the clustering rule(s) currently used for determining those clusters. (It is however possible that using different clustering rule(s), sections currently in different clusters may have been clustered together).

In optional stage 140, characterizing, filtering, separating and/or other action(s) may be performed on the signature(s) detected in stage 136. For instance, characterizing may include characterizing a signature by an attribute such as the number of defects in the signature. The number of defects in a signature may be determined, e.g. by counting all of the defects in the sections clustered in the signature or in the zone defined by a convex hull. The convex hull may be determined as is known in the art, for instance visualized as the shape formed by a rubber band stretched around the signature. In some cases of filtering based on the number of defects, any signature with a number of defects less than a minimum (e.g. 40) may cease to be considered a signature, and may not be processed in the remaining stages of method 100. For instance, this type of filtering may enable a minimum absolute density. Additionally or alternatively, characterizing may include determining an attribute such as a grade for a signature. The grade of a signature may for instance be at least partly dependent on the threshold, e.g. calculated as the quotient of the defect number of the section with the highest defect number out of the clustered sections in the signature, or function thereof, divided by the threshold. In some cases of filtering based on grade, any signature with a grade less than a minimum grade (e.g. 1.4) may cease to be considered a signature, and may not be processed in the remaining stages of method 100. Additionally or alternatively, characterizing may include determining an area for the signature (e.g. area defined by convex hull or minimum of [area of zone defined by convex hull and sum of clustered sections' areas]). In some cases of filtering based on area, any signature with an area greater than a maximum area may cease to be considered a prospective signature, and may not be processed in the remaining stages of method 100. If filtering is performed, then any signature detected in stage 136 which is not filtered out in stage 140, will remain as a detected (Cartesian) signature after stage 140 has been performed.

It is noted that depending on the embodiment, characterizing, filtering, separating and/or other action(s) may or may not be performed one or more times in method 100. Therefore, the examples given in the description herein regarding when characterizing, filtering, separating and/or other action(s) may be performed during method 100 should not be construed as binding. Moreover, certain types of characterizing, filtering, separating and/or other action(s) are described herein as examples only and should not be construed as binding. Characterizing may additionally or alternatively be referred to herein as "determining attributes", or similar. Certain factor(s) (e.g. attribute(s)) at least partly by way of which characterizing, filtering, separating and/or other action(s) may be performed are described herein as examples only, and should not be construed as binding. It is noted that a given factor may or may not be at least partly dependent on a determined threshold, and if the threshold does affect a factor (e.g. grade), the fact that the threshold was determined in accordance with the distribution may or may not be advantageous.

The procedure described above may be repeated for each of the N resolution levels.

Once the procedure has been performed for N resolution levels, then if N=1, stage 144 may be omitted. If N>1 then optionally in stage 144, if there are overlapping detected (Cartesian) signatures (i.e. signatures which overlap) from a plurality of resolution levels, then at least part of the overlapping detected signatures from the plurality of resolution levels, may be unified (referred to in FIG. 1 as "clusters unification"). At least part of the overlapping detected signature may be unified, meaning that not necessarily all of the overlapping detected signatures may be unified, and/or even for a signature which is unified, not necessarily the entire signature may be unified. It is noted that an overlapping detected signature may or may not have undergone stage 140, and therefore may or may not have been previously characterized and/or undergone filtering.

Overlap in signatures may be determined in any appropriate manner. In some embodiments, the overlap may be determined as follows: starting with the highest resolution level, the current resolution level and the two next lower resolution levels may be compared, to find any signatures with common defects. Two signatures which have at least one common defect may be considered to be overlapping. Overlapping signatures may or may not be unified. Although not necessarily so, in some cases when considering two consecutive resolution levels, at least part of a signature from a lower resolution level may be unified with at least part of one or more signatures from the next higher resolution level, but at least part of a signature from a higher resolution level may be unified with only at least part of one signature from the next lower resolution level. In these cases, if a certain signature from a higher resolution level overlaps with two or more signatures of the next lower resolution level, then at least part of the certain signature may nonetheless be unified with only at least part of one of the signatures in the next lower resolution level. However, in other cases when considering two consecutive resolution levels, at least part of a signature from a higher resolution level may be unified with at least part of one or more signatures from the next lower resolution level.

Optionally, for two signatures from two consecutive resolutions levels, at least part of the signature from the lower resolution level may not necessarily be unified with at least part of the signature from the higher resolution level, if the ratio of the number of defects in a signature from the lower resolution level over the number of defects in a signature from the higher resolution level is greater than a maximum ratio. For example, the maximum ratio may be a function of the ratio of the number of sections included in the defect density map for the higher resolution level over the number of sections included in the defect density map for the lower resolution level.

Figure 8:
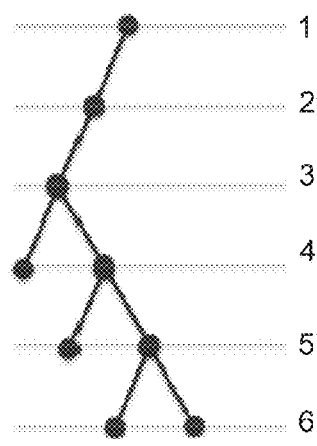
FIG. 8 illustrates unification of Cartesian signatures, in accordance with some embodiments of the presently disclosed subject matter.

FIG. 8 illustrates unification of Cartesian signatures, in accordance with some embodiments of the presently disclosed subject matter. In FIG. 8, six resolution levels are shown, with one being the lowest level resolution and six being the highest level resolution. Two signatures from level six are unified with a signature in level five. This signature in level five as well as another signature in level five are unified with a signature in level four. This signature in level four as well as another signature in level four are unified with a signature in level three. The signature in level three is unified with a signature in level two. The signature in level two is unified with a signature in level one.

Figure 9:
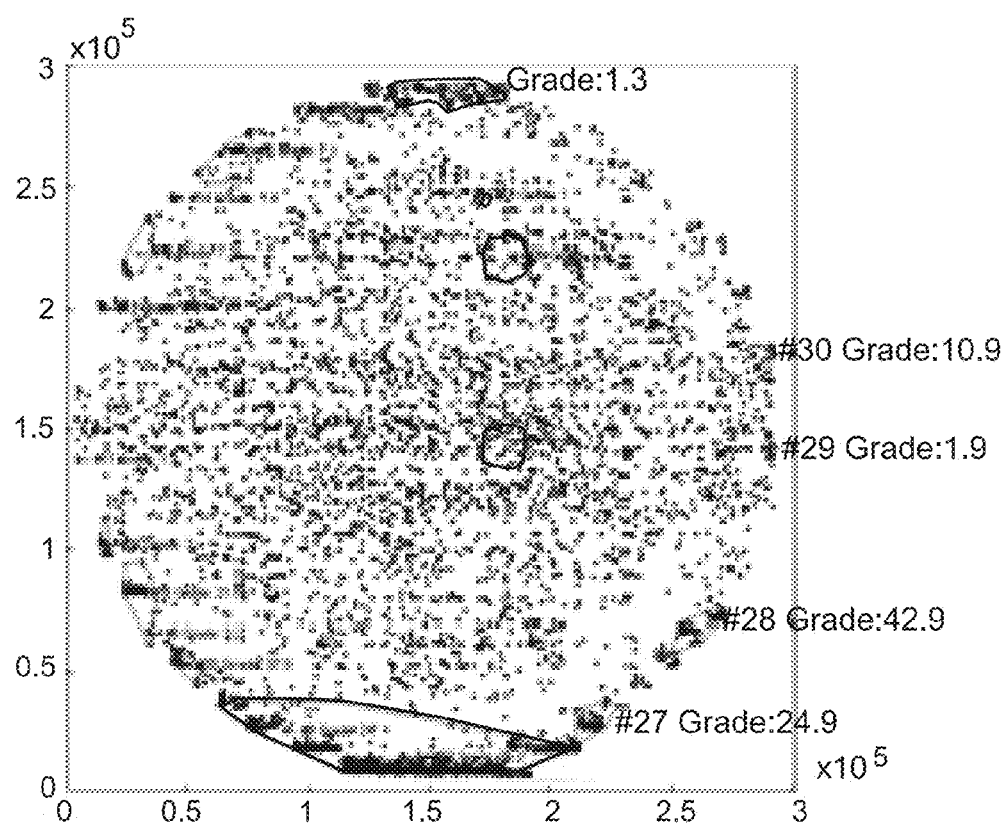
FIG. 9 illustrates signatures on an article defect map, after unification of resolution levels, in accordance with some embodiments of the presently disclosed subject matter.

FIG. 9 illustrates signatures on an article defect map, after unification of the N resolution levels (e.g. N=nine levels), in accordance with some embodiments of the presently disclosed subject matter.

The reader is referred to U.S. Pat. Nos. 8,254,661 and 8,553,970 to Auerbach, which are hereby incorporated by reference herein. These patents describe certain aspects relating to defect density maps of different resolutions for Cartesian coordinates which may possibly be relevant to the current subject matter.

In optional stage 148, characterizing, filtering, separating and/or other action(s) may be performed on the detected signature(s). The detected signature(s) on which characterizing and/or filtering may be performed may include one or more unified signature(s), (where any unified signature may include two or more signature(s) from two or more resolution levels), and/or one or more signature(s), each from a single resolution level. In some cases, stage 148 may not be performed for a signature which is the same signature that previously underwent characterizing and filtering in stage 140.

Characterizing may include characterizing a signature by an attribute such as the number of defects in a signature. The number of defects in a signature may be determined, e.g. by counting all of the defects in the sections clustered in the signature or in the zone defined by a convex hull. In some cases of filtering based on number of defects, any signature with a number of defects less than a minimum (e.g. 40) may cease to be considered a signature, and may not be processed in the remaining stages of method 100. For instance, this type of filtering may enable a minimum absolute density. Additionally or alternatively, characterizing may include determining an attribute such as a grade for a signature. The grade of a signature may for instance be at least partly dependent on the threshold, e.g. calculated as the quotient of the defect number of the section with the highest defect number out of the sections clustered in the signature, or a function thereof, divided by the threshold. In cases of filtering based on grade, any signature with a grade less than a minimum grade (e.g. 1.4) may cease to be considered a signature, and may not be processed in the remaining stages of method 100. Additionally or alternatively, characterizing may include determining an area for the signature (e.g. area defined by convex hull or minimum of [area of zone defined by convex hull and sum of clustered sections' areas]). In some cases of filtering based on area, any signature with an area higher than a maximum area may cease to be considered a signature, and may not be processed in the remaining stages of method 100. Additionally or alternatively, assume that for a unified signature which includes signatures from different resolution levels, the ratio of the number of defects in the signature from the lower resolution level over the number of defects in the signature from the higher resolution level is greater than a maximum ratio (e.g. which may be a function of the ratio of the number of sections included in the defect density map for the higher resolution level over the number of sections included in the defect density map for the lower resolution level). In this case, the unified signature may optionally be separated so that the signature from the higher resolution level and that from the lower resolution level are no longer unified, and/or the lower resolution level signature may then optionally be filtered out and not processed in the remaining stages of method 100. Additionally or alternatively, if there are two signatures from different resolution levels, and there is a resolution gap in between, meaning that the signatures do not represent adjacent resolution level(s), the signature from the higher resolution level may optionally be filtered out, and may not be processed in the remaining stages of method 100.

Figure 10:
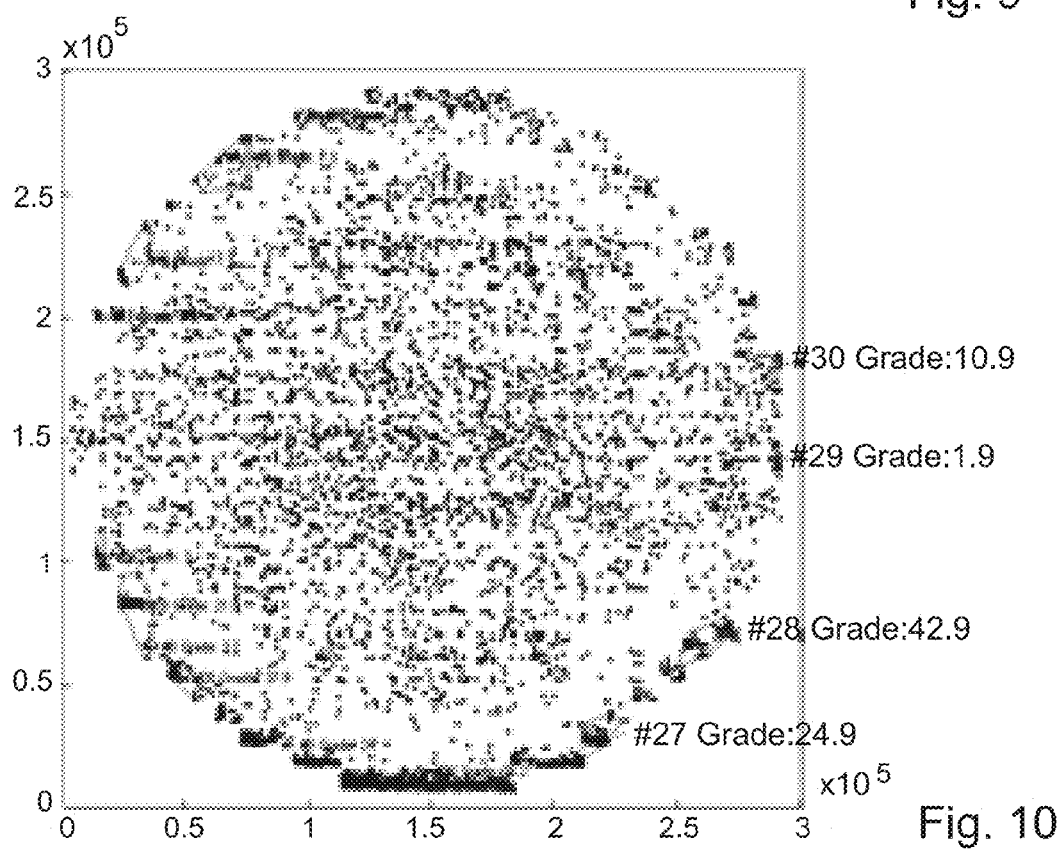
FIG. 10 illustrates the remaining detected Cartesian signatures on an article defect map, in accordance with some embodiments of the presently disclosed subject matter.

FIG. 10 illustrates the detected (Cartesian) signatures on an article defect map, remaining after performance of stage 148, in accordance with some embodiments of the presently disclosed subject matter.

Additionally or alternatively, signature detection may occur for polar coordinates. In some embodiments, signature detection for polar coordinates may be performed if the article is round and/or has a perimeter which is at least partly curved. In some embodiments, polar analysis may be better able than Cartesian analysis to detect signatures due to events which caused defects that are distributed along a curve (and which may be included in such signatures). For instance, if the article (e.g. wafer) is round and/or has a perimeter which is at least partly curved, the regions in the article closer to the perimeter may possibly be more difficult to manufacture and may therefore be more prone to defects. Additionally or alternatively, for instance, certain actions which may be performed on the article (e.g. polish on a wafer) may be performed while turning around the article and therefore an inaccuracy in performing such an action may result in defects at a certain radius or radius range.

In stage 152, the coordinates of the defects in an article defect map acquired in stage 104 may be converted from Cartesian coordinates to polar coordinates.

Alternatively, the coordinates of the defects in an article defect acquired in stage 104 may have included polar coordinates.

As mentioned above, an article defect map may include the defect coordinates, indices and/or other defect information.

Optionally a scanned portion map may be used in determining defect density maps (as will be described below). Scanned portion map(s) for polar coordinates may have been separately determined in stage 108, may have been converted from the Cartesian coordinates scanned portion map in stage 108, and/or may be converted at any time before usage.

If conversion is taking place, then conversion of a scanned portion map from Cartesian coordinates to polar coordinates may be performed for each resolution level of polar coordinates where there is a scanned portion map in Cartesian coordinates in the same resolution level, and/or may be performed for one resolution level, and then downsampled and/or upsampled, as required for the other resolution level(s).

For instance, in order to convert a scanned portion map in Cartesian coordinates for the highest resolution level to polar coordinates, the scanned portion map may be converted to a binary map where portions with values greater than a minimum are set to true, and portions with values less than the minimum are set to false. The coordinates of the portions which were set to true may then be converted to polar coordinates. For further illustration, assume that the sections in polar coordinates are in a shape of a circular trapezoid and the sections in Cartesian coordinates are in a shape of a square. Further assume that for the highest resolution in Cartesian coordinates and for the highest resolution in polar coordinates, each circular trapezoid includes a plurality of squares. A possible example for conversion may dictate that if the number of scanned squares (e.g. whose area is entirely included in the trapezoid and whose scanned portion is above, say 50%) is above a minimum number (e.g. 50% of total number of squares at least partly included in the trapezoid) then the trapezoid has estimated scanned portion set to, say 100%. Other examples of conversion may additionally or alternatively be used.

For M (M≥1) resolution levels, the following procedure may be performed. If signature detection for both polar and Cartesian coordinates is being performed, stage 152 and/or the following procedure may be performed at least partly concurrently to the Cartesian detection, before the Cartesian detection or after the Cartesian detection. If both Cartesian and polar coordinates detection is being performed, M may or may not equal N. M may equal three or a higher or lower number, greater than or equal to one. If M>1, the procedure may be performed for the resolution levels in any order. Typically although not necessarily, more sections correspond to a higher resolution level than to a lower resolution level.

Beginning with a first resolution level, an article defect density map, comprising a plurality of sections corresponding to the current resolution level which is indicative of defect numbers for the sections may be acquired. As explained above, the article defect density map may optionally also include "trivial sections" in addition to these sections. The subject matter does not limit how the article density map may be acquired, however for the purpose of illustration, some examples are now provided. Assume that in accordance with a current resolution level, at least part of an article defect map acquired in stage 104 may be divided into the plurality of sections. These sections may be defined by polar coordinates. Typically although not necessarily, these sections may be circular trapezoid. The sections may not necessarily be the same size. (For simplicity's sake it is assumed that the defect map acquired in stage 104 included Cartesian coordinates for the defects and the coordinates were converted to polar coordinates in stage 152).

Figure 11:
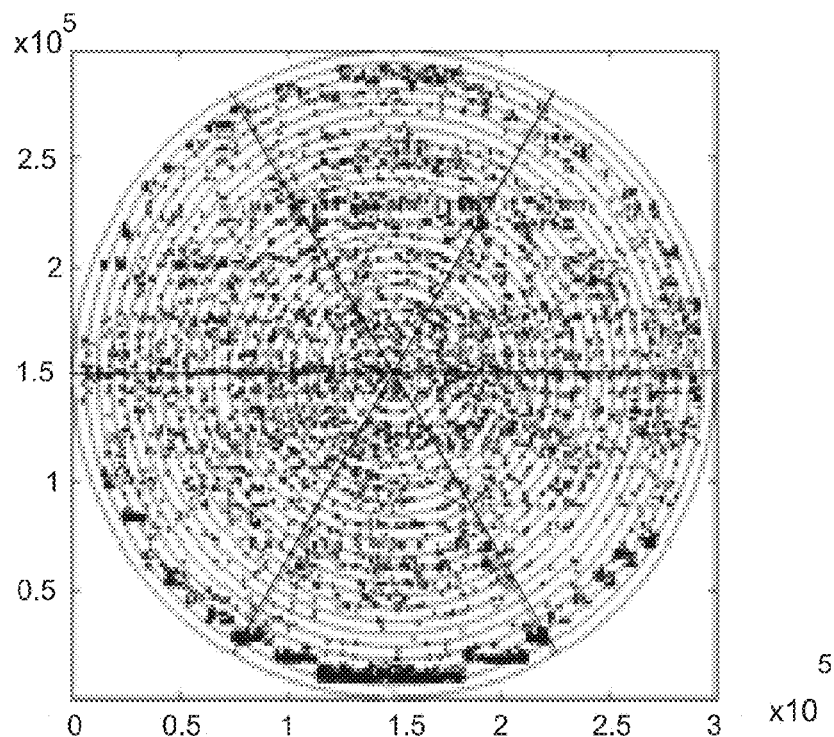
FIG. 11 illustrates an article defect map divided into sections defined by polar coordinates and corresponding to a certain resolution, in accordance with some embodiments of the presently disclosed subject matter.

FIG. 11 illustrates an article defect map divided into sections corresponding to a certain resolution, in accordance with some embodiments of the presently disclosed subject matter. In this figure, the sections are delineated by radial and angular grid lines and therefore are defined by polar coordinates.

Acquiring the defect density map may therefore include, for example, dividing at least part of an article defect map into the plurality of sections corresponding to the current resolution level and determining the defect numbers for these sections. For instance, the defect numbers for these sections may be determined by counting defects in each section. Additionally or alternatively, for instance, the defect numbers for the sections may be determined by counting defects in each section and then (for at least one of the sections) normalizing the count, using an acquired scanned portion map. Therefore, the defect number for any section may be determined by counting defects in that section, and optionally normalizing the count using an acquired scanned portion map. Normalizing the count may include normalizing by scanned portion of the section (which may be an actual scanned portion of the section or an estimated scanned portion of the section) and/or normalizing by size of the section. For instance, normalization by size may be performed if not all sections in the defect density map are necessarily the same size.

The defect number for a section in the article defect density map may be indicative of defect density for that section. However, the manner of determining defect numbers may vary depending on the embodiment. If the area of each section in the current resolution level may be considered equivalent with regard to density, then the count of defects in each section may be used as an effective substitute for defect density. Additionally or alternatively, normalization of the count may be performed, for instance when the count alone may not be considered an appropriate substitute for defect density due to variation in what should be considered the area for various sections in the current resolution level with regard to density (e.g. due to varying scanned portion, varying size, etc).

The acquiring of the scanned portion map which may be used for normalizing may have included determination of a scanned portion map in stage 108, conversion to polar coordinates (if not determined in polar coordinates), downsampling and/or upsampling. For instance the acquired scanned portion map which may be used for normalizing may be a scanned portion map which was determined in stage 108 and/or converted, a scanned portion map which was computed by down-sampling a scanned portion map for a higher resolution determined in stage 108 and/or converted, or a scanned portion map which was computed by up-sampling a scanned portion map for a lower resolution which was determined in stage 108 and/or converted. In the case of downsampling, a scanned portion map for a higher resolution may be downsampled by, for instance, averaging the scanned portions of the various sections (e.g. fractions, percentages) in the higher resolution which are included in a lower resolution section in order to derive an estimated scanned portion (e.g. fraction, percentage) for the lower resolution section, and/or by summing up the sizes of the various sections in the higher resolution which are included in the lower resolution section in order to determine a size for the lower resolution section. In the case of up-sampling, a scanned portion map for a lower resolution may be upsampled by, for instance, estimating that the same scanned portion of the section in the lower resolution would also apply to a higher resolution section included in the lower resolution section, and/or by dividing the size of the section in the lower resolution which includes the higher resolution section by the ratio of resolutions (=higher/lower) in order to determine the size of the lower resolution section.

Optionally, a scanned portion map may indicate a scanned portion value of zero for any section where the scanned portion of the section is less than a minimum value. Optionally a scanned portion map may indicate scanned portion and/or section size for one or more trivial sections. Depending on the embodiment, a scanned portion map may include a single map or a plurality of maps. In the former case, for instance, size and/or scanned portion, etc. may be indicated on the map. In the latter case, for instance, one of the plurality may be indicative of size of section, another indicative of scanned portion of section, etc.

Optionally, there may be trivial section(s) that may be masked. If there are trivial sections, then optionally the defect number(s) for one or more of these trivial sections may be determined, for instance in order to harmonize implementation, even though these trivial sections may be masked in the defect density map.

For simplicity's sake it is assumed that there are trivial section(s) for polar coordinates. The defect density map for polar coordinates may mask "trivial" sections located up to a certain radius from the center (e.g. "trivial" sections with a radius up to ⅓ of the maximum radius of the article may be masked). One reason for masking may be because the ("trivial") sections near the center are relatively small compared to sections away from the center, and therefore the effect of defects in these relatively small "trivial" sections on the analysis may be disproportionate. Another reason for masking may be that polar analysis may be unlikely to detect signatures closer to the center (where the likelihood of the signature spanning a significant angle is lower) and therefore Cartesian analysis may be more appropriate for detecting signatures closer to the center. Masking of a "trivial" section may mean that regardless of the traits of the "trivial" section (e.g. size, scanned portion, defect number, etc), the "trivial" section may be ignored when determining a distribution, determining a threshold, identifying and clustering, and therefore may not be clustered into a signature. It is noted that masking a "trivial" section may not necessarily include marking the "trivial" section such as the blacking out shown in FIGS. 13 and 14 or marking the "trivial" section in any visible manner on the defect density map.

Figure 12:
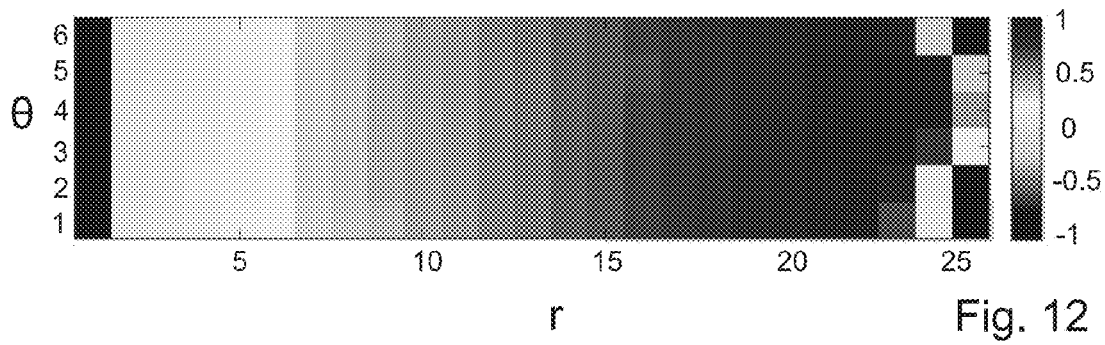
FIG. 12 illustrates an article defect density map, where the radius is shown horizontally and the angle is shown vertically, in accordance with some embodiments of the presently disclosed subject matter.

FIG. 12 illustrates an article defect density map, where the radius is shown horizontally and the angle is shown vertically, in accordance with some embodiments of the presently disclosed subject matter. The defect density map illustrated in FIG. 12 may have been acquired, for instance, by counting the defects in each section of the defect map illustrated in FIG. 11.

Figure 13:
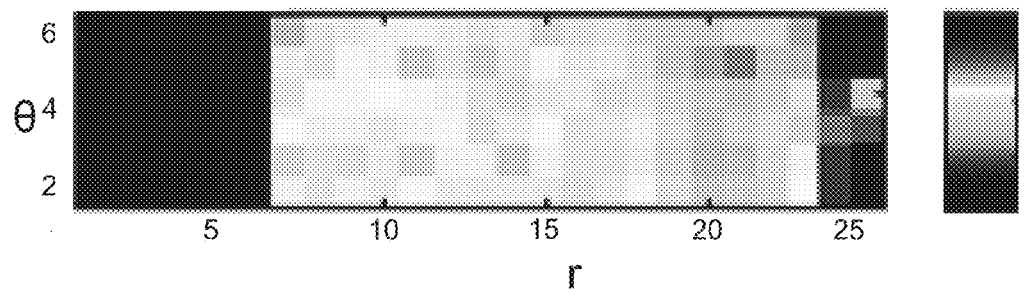
FIG. 13 illustrates another article defect density map, where the radius is shown horizontally and the angle is shown vertically, in accordance with some embodiments of the presently disclosed subject matter.

FIG. 13 illustrates another article defect density map, where the radius is shown horizontally and the angle is shown vertically, in accordance with some embodiments of the presently disclosed subject matter. The defect density map illustrated in FIG. 13 may have been acquired, for instance, by counting the defects in each section of the defect map illustrated in FIG. 11, and then for each section, normalizing the count by the scanned portion and by the size of the section. "Trivial" sections near the center of the article are shown blacked out in FIG. 13.

Figure 14:
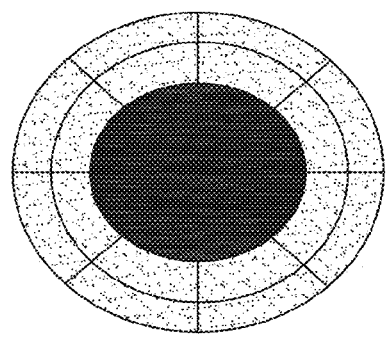
FIG. 14 illustrates an article defect density map, where the radius is shown as a distance from the center and the angle is shown as an angle from a fixed direction, in accordance with some embodiments of the presently disclosed subject matter.

FIG. 14 illustrates an article defect density map, where the radius is shown as a distance from the center and the angle is shown as an angle from a fixed direction, in accordance with some embodiments of the presently disclosed subject matter. In this figure, "trivial" sections near the center of the article are shown blacked out.

Referring again to FIG. 1, FIG. 1 illustrates embodiments where in stage 156, the defects in the plurality of sections may be counted (referred to as a two-dimensional histogram), where in stage 160, a scanned portion map determined in stage 108 and/or converted may be downsampled if the current resolution is lower than the resolution of the scanned portion map, where in stage 164, for at least one of the plurality of sections, the count may be normalized by scanned portion and size, using the (possibly downsampled) scanned portion map, and where in stage 168, the "trivial" sections near the center may be masked. Optionally stages 156, 160, and 164 may have also been performed for trivial sections, e.g. in order to harmonize implementation. As explained herein, embodiments which differ from those illustrated in FIG. 1 may be additionally or alternatively implemented.

In stage 172, a distribution representative of the defect numbers or function thereof (or in other words representative of a function of the defect numbers) may be determined. The distribution may be considered representative of the defect numbers or function thereof, even if the distribution does not take into account the defect numbers for all of the plurality of sections. For example, there may be cases where the defect number(s) of particular section(s) may be ignored. Continuing with this example, optionally, the number of defects in any section corresponding to a zero scanned value in the scanned portion map (e.g. none of the section was actually scanned or estimated to have been scanned) may be ignored when determining the distribution. For instance, the number of defects in any section corresponding to a zero scanned value in the scanned portion map may be ignored, if normalization for a scanned portion map did not take place. Continuing with this example, additionally or alternatively, optionally sections with a defect number equal to zero may be ignored when determining the distribution. For instance, if there is no scanned portion map, it may be assumed, (possibly erroneously) that sections with a defect number equal to zero were not scanned.

Any type of distribution may be used to represent the defect numbers or function thereof. In some embodiments, the distribution may be a histogram (e.g. a one dimensional histogram) or a function of a histogram. For instance, if a histogram is used or a function thereof, the horizontal axis may show discrete bins representative of defect numbers or function thereof. The vertical axis may indicate the number of sections. Therefore for each bin, the height of a rectangle at that bin may be indicative of the number of sections corresponding to that bin. (If the number of corresponding sections is zero, the bin may be considered non-active. In this case because the height would be zero, the rectangle may optionally be omitted). Optionally, if the number of corresponding section(s) is lower than a certain minimum, the value for the number of section(s) may be set to zero. Each bin along the horizontal axis, for instance, may be higher by one unit from the bin on the left thereof (meaning the bin size would be one unit). Additionally or alternatively, for instance, a function may be applied in cases where the histogram would otherwise be sparse due to few active bins such as multiplying the bin size (e.g. initially set to one unit) by a multiplier (e.g. larger than 1) so as to cause the bin size in the histogram to be greater than one unit. Such a function may be applied iteratively until the histogram is no longer considered sparse. If the distribution is a function of the histogram, the function may be any function. For instance, the distribution may be a histogram smoothed by convolution with a smooth kernel. Additionally or alternatively, the distribution may be a natural log of the histogram or of a smoothed histogram (e.g. where values on the vertical axis=natural log of (numbers of section(s)+1) where the "1" or any other small number may be added to the number of sections so as to not result in an undefined value, in cases where the number of sections is zero).

In stage 176, a threshold in accordance with the distribution is determined The threshold may be determined in any appropriate manner, as long as the threshold is determined in accordance with the distribution.

For instance, the threshold may be determined by fitting to the distribution an approximation function out of a group of functions and setting the threshold as the point where the approximation function crosses the horizontal axis. The reader is referred again to the aforementioned U.S. application Ser. No. 14/279,192 which is hereby incorporated by reference. In that application, the distribution is not representative of the defect numbers or function thereof but rather of comparison values. However similar ways of determining an approximation function described in the co-pending application may be used in some embodiments of the presently disclosed subject matter, mutatis mutandis. Each approximation function in the group of approximation functions used in some embodiments of the presently disclosed subject matter may or may not be a parabola function or a composition of a parabola function and a line parallel to the horizontal axis. For simplicity's sake, a vertical (dependent) variable will be referred to as "y", and a horizontal (independent) variable as "x". Assuming embodiments with a composition of a parabola function and a line parallel to the horizontal axis, the various approximation functions in the group may therefore each be expressed as a composition of a parabola function $y=ax^2+bx+c$ and a line parallel to the horizontal axis (y=constant), where "a", "b" and "c" and the constant for the line parallel to the horizontal axis may take on different values for different approximation functions in the group. In this example, "b" may or may not be set to zero for all approximation functions in the group.

It is noted that despite the usage of terms such as axis, rectangle, etc. in order to ease the understanding of the reader, it may not be necessary to plot the distribution and/or approximation function(s).

When fitting to the distribution is performed, the fitting may be carried out in some cases, by minimizing an error estimation function, which is based on the errors (differences) between the distribution data and the approximation function. The error estimation function may be a least mean squared (LMS) function, and/or any other known statistical method. For instance, for each defect number or function thereof ($N_i$) up to the highest defect number or function thereof for which there is an actual associated distribution value (e.g. number of sections, any of the other examples discussed above, etc), the actual distribution value ($y_{actual,Ni}$) associated with $N_i$ may be subtracted from the estimation "$y_{estimation(Fj),Ni}$" value estimated by one of the approximation function ($F_j$) in the group for $N_i$. The results ($y_{estimation(Fj),Ni} - y_{actual,Ni}$) may be squared for each $N_i$, and then summed together. That is, the error (or score) for each approximation function Fj may be $\Sigma(y_{estimation(Fj),Ni} - y_{actual,Ni})^2$ where the summation is for all $N_i$. The approximation function Fj having the minimal score from the group may be selected in such an implementation. It should be clear to a person who is skilled in the art that not all possible approximation functions are necessarily analyzed for each distribution, and that various techniques are known in the art for fitting an approximation function to a distribution.

Additionally or alternatively, the fitting of the approximation function may in some cases include one or both of the following two aspects: applying a fitting which gives smaller weight to common defect number(s) or function thereof; and/or applying a fitting which gives smaller weight to defect number(s) or function thereof whose distance from an average defect number or function thereof is large. The reader is referred to the aforementioned U.S. application Ser. No. 14/279,192 where these aspects are described with respect to comparison values (rather than defect numbers or function thereof) for more details on possible embodiments, mutatis mutandis.

The group of approximation functions may or may not be predefined. Optionally, if the group of approximation functions is not predefined, there may be a selection stage where an appropriate group of approximation functions is selected from among various groups of approximation functions, in any suitable manner.

Figure 15:
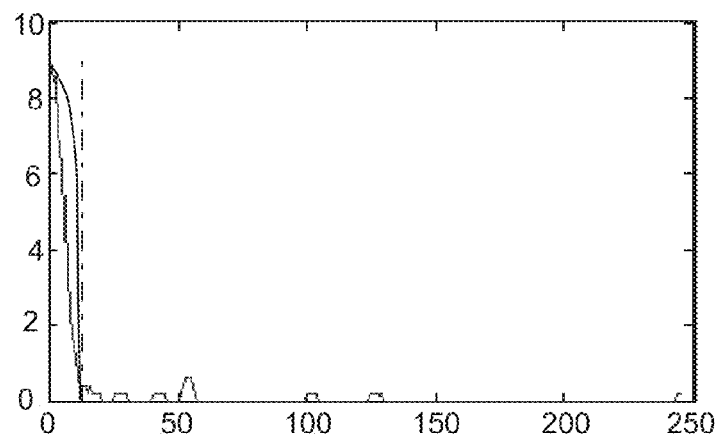
FIG. 15 illustrates a distribution representative of defect numbers, in accordance with some embodiments of the presently disclosed subject matter.

FIG. 15 illustrates a distribution representative of defect numbers, in accordance with some embodiments of the presently disclosed subject matter. In this figure, which may be associated with a low resolution defect density map, nine sections are shown as having zero defects. Other defect numbers each correspond to less than nine sections. A parabola is shown fitted to the distribution and the horizontal axis crossing of the parabola is set as the threshold.

Continuing with stage 176, sections out of the plurality of sections in the article defect density map, with defect numbers or function thereof above the threshold may be identified. For instance sections with defect numbers of function thereof above the threshold may be considered suspiciously dense.

A threshold determined in accordance with a distribution may be advantageous in some instances when identifying sections, compared to a fixed threshold. For instance, a fixed threshold may be a threshold which is the same regardless of the resolution level. However, a lower number of defects in a section corresponding to a higher resolution level may be proportionately equivalent to a higher number of defects in a section corresponding to a lower resolution level. Therefore a fixed threshold which may be appropriate for a higher resolution level may in some cases lead to falsely identified sections corresponding to a lower resolution section, whereas a fixed threshold which may be appropriate for a lower resolution level may lead in some cases to non-identification of sections corresponding to a higher resolution level which maybe should have been identified. Additionally or alternatively, for instance, even if different fixed thresholds are set for different resolution levels, the fixed thresholds may not work in some cases as well as a threshold which is determined in accordance with the distribution (For example, the fixed thresholds may not work as well in some cases when relating to different articles (e.g. different wafers), different recipes, different scan sets, etc). In other instances, a threshold determined in accordance with a distribution may not necessarily be advantageous when identifying the sections.

Figure 16:
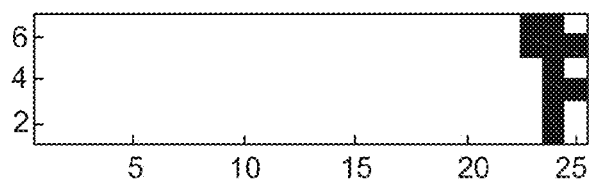
FIG. 16 illustrates identified sections in an article defect density map, in accordance with some embodiments of the presently disclosed subject matter.

FIG. 16 illustrates identified sections in an article defect density map, in accordance with some embodiments of the presently disclosed subject matter. Each section whose defect number is above the threshold is identifiable in FIG. 16. It should be evident that identifying sections may not necessarily include marking the sections in the manner shown in FIG. 16, or marking in any visible manner on the defect density map when performing method 100.

In stage 180, at least part of adjoining identified sections may be clustered into one or more signatures, thus detecting these signature(s). Each cluster may correspond to one (polar) signature. For instance each cluster may include two or more adjoining identified sections. The sections in a signature may also be referred to as "clustered sections".

Depending on the clustering rule used in a particular embodiment, all adjoining identified sections may be clustered, or not necessarily all adjoining identified sections may be clustered.

It is noted that the term "adjoining sections" or "adjoining identified sections" refers to sections whose coordinates would mean that the sections would be adjoining on the article defect map. Depending on the form of the defect density map, these sections may or may not be actually adjoining on the defect density map.

In some embodiments of adjoining identified sections, an identified section with certain ranges of radii and angles may be clustered with an identified section having the same angle range but an adjacent radius range, or having the same radius range but an adjacent angle range. This would mean that for a given section, up to four other sections having the same radius range but adjacent angle range or the same angle range but adjacent radius range may be clustered with that section. In other embodiments of adjoining identified sections, an identified section with a certain range of radii and angles may be clustered with an identified section having an adjacent angle range and an adjacent radius range, the same angle range but adjacent radius range, or the same radius range but adjacent angle range. This would mean that for a given section, up to eight other sections having adjacent angle range and adjacent radius range, the same angle range but adjacent radius range, or the same radius range but adjacent angle range may be clustered with that section. It is noted that the largest angle range (e.g. 300 to 360) is adjacent to the smallest angle range (e.g. 0 to 60 degrees) in an article defect map and therefore sections with the largest angle range and smallest angle range may be adjoining sections (depending on the radius ranges) even if not shown as adjoining on a defect density map.

Each cluster may be independent. This means that if there is a plurality of clusters, sections that are in different clusters would not have been clustered together based on the clustering rule(s) currently used for determining a cluster. (It is however possible that using different clustering rule(s), sections currently in different clusters may have been clustered together).

In optional stage 184, characterizing, filtering, separating and/or other action(s) may be performed on the signature(s) detected in stage 180. For instance, characterizing may include characterizing a signature by an attribute such as the number of defects in the signature. The number of defects in a signature may be determined, e.g. by counting all of the defects in the sections clustered in the signature or in the zone between a convex hull and an inner boundary. The convex hull may be determined as is known in the art, for instance visualized as the shape formed by a rubber band stretched around the signature. The inner boundary of the signature may be determined, for instance by dividing the signature into different angle ranges; selecting, for each angle range where there is at least one defect, the position of the defect with the smallest radius; and then forming the inner boundary by connecting these positions. In some cases of filtering based on the number of defects, any signature with a number of defects less than a minimum (e.g. 40) may cease to be considered a signature, and may not be processed in the remaining stages of method 100. For instance, this type of filtering may enable a minimum absolute density. Additionally or alternatively, characterizing may include determining an attribute such as a grade for a signature. The grade of a signature may for instance be at least partly dependent on the threshold, e.g. calculated as the quotient of the defect number of the section with the highest defect number out of the clustered sections in the signature, or function thereof, divided by the threshold. In some cases of filtering based on grade, any signature with a grade less than a minimum grade (e.g. 1.4) may cease to be considered a signature, and may not be processed in the remaining stages of method 100. Additionally or alternatively, characterizing may include determining an area for the signature (e.g. area of zone between convex hull and inner boundary or minimum of [area of zone between convex hull/inner boundary and sum of clustered sections' areas]). In some cases of filtering based on area, any signature with an area greater than a maximum area may cease to be considered a prospective signature, and may not be processed in the remaining stages of method 100. Additionally or alternatively, signatures may optionally be filtered by angle. For instance, any signature which does not span an angle above a minimum angle (e.g. 180 degrees) may cease to be considered a signature, and may not be processed in the remaining stages of method 100. Additionally or alternatively, signatures may optionally be filtered by radius. For instance, any signature with an average radius in a certain range (e.g. below 0.67 if the radius is set to range from 0 at the center of the article to 1 at the perimeter of the article) may cease to be considered a signature, and may not be processed in the remaining stages of method 100, if retention of only the outer signatures is desired. The average radius of a signature may be calculated for instance by taking the average of the radii of the defects in the signature. If filtering is performed, then any signature detected in stage 180 which is not filtered out in stage 184, will remain as a detected (polar) signature after stage 184 has been performed.

The procedure described above may be repeated for each of the M resolution levels.

Once the procedure has been performed for M resolution levels, then if M=1, stage 188 may be omitted. If M>1 then optionally in stage 188, if there are overlapping detected (polar) signatures (i.e. signatures which overlap) from a plurality of resolution levels, then at least part of the overlapping detected signatures from the plurality of resolution levels may be unified (referred to in FIG. 1 as "clusters unification"). At least part of the overlapping detected signature may be unified, meaning that that not necessarily all of the overlapping detected signatures may be unified, and/or even for a signature which is unified, not necessarily the entire signature may be unified. It is noted that an overlapping detected signature may or may not have undergone stage 184, and therefore may or may not have been previously characterized and/or undergone filtering.

Overlap in signatures may be determined in any appropriate manner. In some embodiments, the overlap may be determined as follows: starting with the highest resolution level, the current resolution level and the two next lower resolution levels may be compared, to find any signatures with common defects. Two signatures which have at least one common defect may be considered to be overlapping. Overlapping signatures may or may not be unified. Although not necessarily so, in some cases when considering two consecutive resolution levels, at least part of a signature from a lower resolution level may be unified with at least part of one or more signatures from the next higher resolution level, but at least part of a signature from a higher resolution level may be unified with only at least part of one signature from the next lower resolution level. In these cases, if a certain signature from a higher resolution level overlaps with two or more signatures of the next lower resolution level, then at least part of the certain signature may nonetheless be unified with only at least part of one of the signatures in the next lower resolution level. However, in other cases when considering two consecutive resolution levels, at least part of a signature from a higher resolution level may be unified with at least part of one or more signatures from the next lower resolution level.

Optionally, for two signatures from two consecutive resolutions levels, at least part of the signature from the lower resolution level may not necessarily be unified with at least part of the signature from the higher resolution level, if the ratio of the number of defects in a signature from the lower resolution level over the number of defects in a signature from the higher resolution level is greater than a maximum ratio. For example the maximum ratio may be a function of the ratio of the number of sections included in the defect density map for the higher resolution level over the number of sections included in the defect density map for the lower resolution level.

Figure 17:
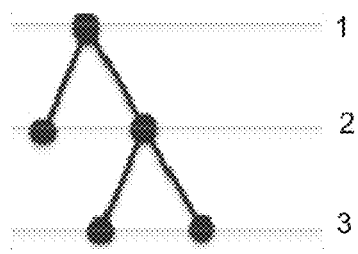
FIG. 17 illustrates unification of polar signatures, in accordance with some embodiments of the presently disclosed subject matter.

FIG. 17 illustrates unification of polar signatures, in accordance with some embodiments of the presently disclosed subject matter. In FIG. 17, three resolution levels are shown, with one being the lowest level resolution and three being the highest level resolution. Two signatures from level three are unified with a signature in level two. This signature in level two, as well as another signature in level two are unified with a signature in level one.

Figure 18:
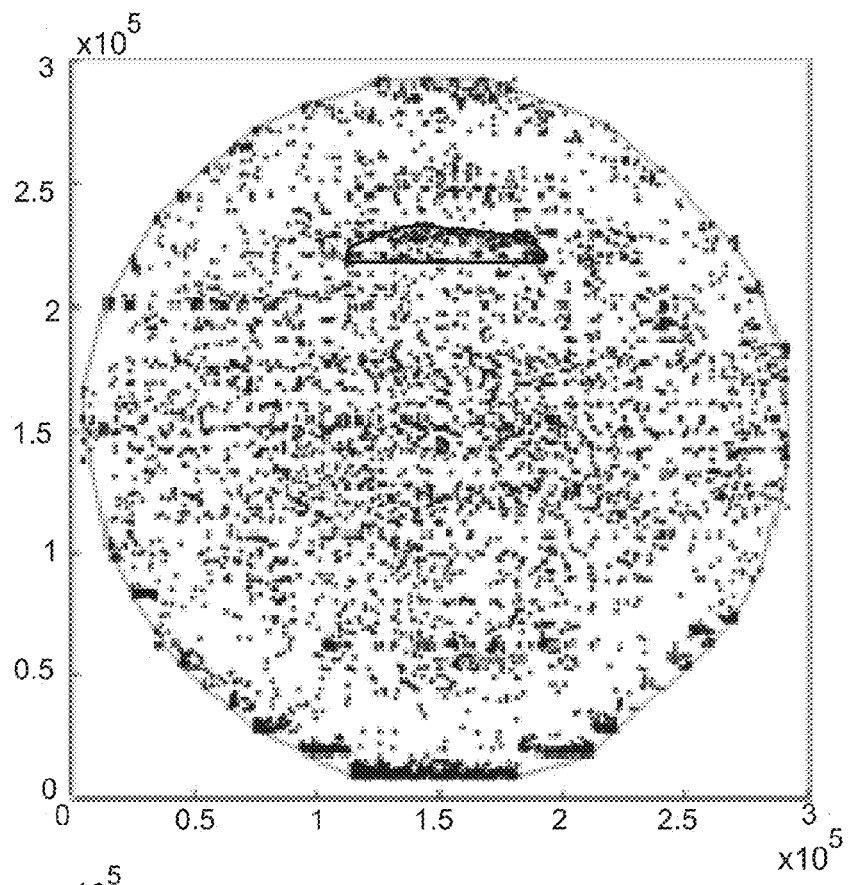
FIG. 18 illustrates signatures on an article defect map, after unification of the resolution levels, in accordance with some embodiments of the presently disclosed subject matter.

FIG. 18 illustrates signatures on an article defect map, after unification of the M resolution levels (e.g. M=three levels), in accordance with some embodiments of the presently disclosed subject matter.

In optional stage 192, characterizing, filtering, separating and/or other action(s) may be performed on the detected signature(s). The detected signature(s) on which characterizing and/or filtering may be performed may include one or more unified signature(s), (where any unified signature may include two or more signature(s) from two or more resolution levels), and/or one or more signature(s), each from a single resolution level. In some cases, stage 192 may not be performed for a signature which is the same signature that previously underwent characterizing and filtering in stage 184.

Characterizing may include characterizing a signature by an attribute such as the number of defects in a signature. The number of defects in a signature may be determined, e.g. by counting all of the defects in the sections clustered in the signature or in the zone between a convex hull and an inner boundary. In some cases of filtering based on number of defects, any signature with a number of defects less than a minimum (e.g. 40) may cease to be considered a signature, and may not be processed in the remaining stages of method 100. For instance, this type of filtering may enable a minimum absolute density. Additionally or alternatively, characterizing may include determining an attribute such as a grade for a signature. The grade of a signature may for instance be at least partly dependent on the threshold, e.g. calculated as the quotient of the defect number of the section with the highest defect number out of the sections clustered in the signature, or a function thereof, divided by the threshold. In cases of filtering based on grade, any signature with a grade less than a minimum grade (e.g. 1.4) may cease to be considered a signature, and may not be processed in the remaining stages of method 100. Additionally or alternatively, characterizing may include determining an area for the signature (e.g. area of zone between convex hull and inner boundary or minimum of [area of zone between convex hull/inner boundary and sum of clustered sections' areas]). In some cases of filtering based on area, any signature with an area higher than a maximum area may cease to be considered a signature, and may not be processed in the remaining stages of method 100. Additionally or alternatively, signatures may optionally be filtered by angle. For instance, any signature which does not span an angle above a minimum angle (e.g. 180 degrees) may cease to be considered a signature, and may not be processed in the remaining stages of method 100. Additionally or alternatively, signatures may optionally be filtered by radius. For instance, any signature with an average radius in a certain range (e.g. below 0.67 if the radius is set to range from 0 at the center of the article to 1 at the perimeter of the article) may cease to be considered a signature, and may not be processed in the remaining stages of method 100, if retention of only the outer signatures is desired. Additionally or alternatively, assume that for a unified signature which includes signatures from different resolutions levels, the ratio of the number of defects in the signature from the lower resolution level over the number of defects in the signature from the higher resolution level is greater than a maximum ratio (e.g. which may be a function of the ratio of the number of sections included in the defect density map for the higher resolution level over the number of sections included in the defect density map for the lower resolution level). In this case, the unified signature may optionally be separated so that the signature from the higher resolution level and that from the lower resolution level are no longer unified, and/or the lower resolution level signature may then optionally be filtered out and not processed in the remaining stages of method 100. Additionally or alternatively, if there are two signatures from different resolution levels, and there is a resolution gap in between, meaning that the signatures do not represent adjacent resolution level(s), the signature from the higher resolution level may optionally be filtered out, and may not be processed in the remaining stages of method 100.

Figure 19:
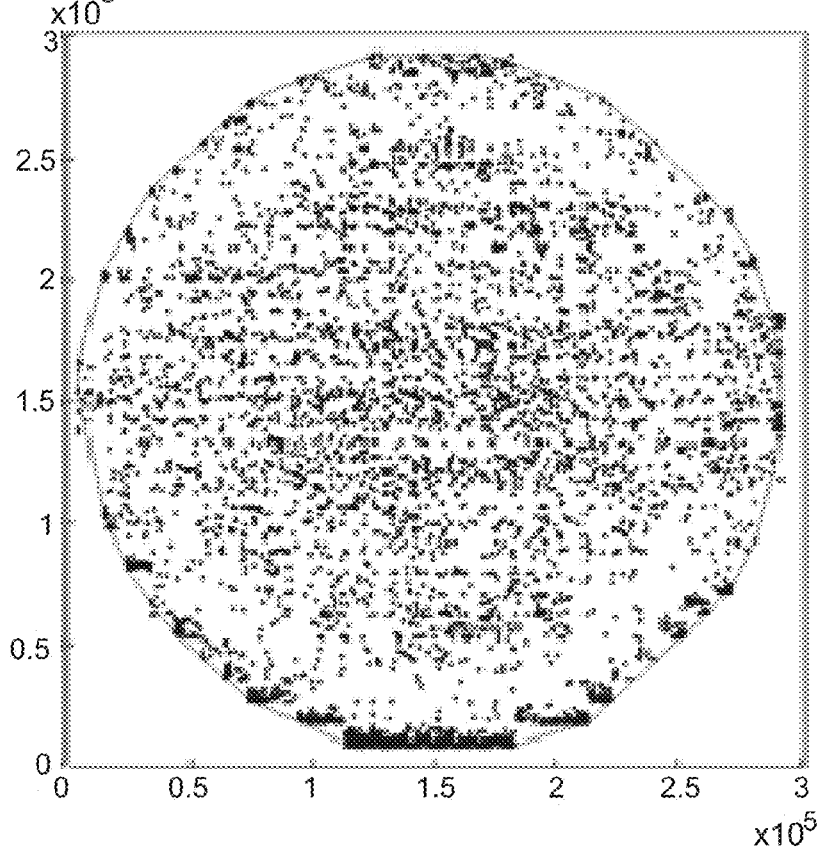
FIG. 19 illustrates the remaining detected polar signatures on an article defect map, in accordance with some embodiments of the presently disclosed subject matter.

FIG. 19 illustrates the detected (polar) signatures on an article defect map, remaining after performance of stage 192, in accordance with some embodiments of the presently disclosed subject matter.

If only polar or Cartesian coordinates were used to detect signatures, then method 100 may end. Otherwise, method 100 may continue with stages 196 and 200.

In stage 196, it may be determined which Cartesian detected signature(s), or part(s), thereof and which polar detected signature(s), or part(s) thereof, to combine, if any. Therefore, zero or more combined signature(s) may result from combining stage 196.

For instance, at least part of at least one Cartesian signature and at least part of at least one polar signature may be combined into a combined detected signature.

Possibly, for a detected Cartesian signature and a detected polar signature with at least one defect in common, at least part of the detected Cartesian signature and at least part of the detected polar signature, may or may not be combined, depending on a result of at least one test.

The subject matter does not limit the test(s), but for the purpose of illustration some examples will now be provided.

For instance, a density test may be indicative of the relationship between the density of a Cartesian signature which overlaps (i.e. has at least one defect in common with) a polar signature and a density value. Depending on the relationship, at least part of the Cartesian signature may be combined with at least part of the polar signature or the Cartesian signature may not be combined with the polar signature. In some cases of this instance, if the Cartesian signature which overlaps the polar signature has a density at or below a predetermined function of the density of the polar signature (e.g. density_Cartesian≤20*density_polar), then at least part of the Cartesian signature may be combined with at least part of the polar signature (e.g. the Cartesian signature may cease to be considered as a distinct signature). Otherwise, if the Cartesian signature has a density above a predetermined function of the density of the polar function, then the Cartesian signature may not be combined with the polar signature. The signatures may remain distinct, but common defects may be reported only once (e.g. in the denser signature). The density of a signature may be determined, for instance, by dividing the number of defects in the signature over the area of the signature.

Figure 20:
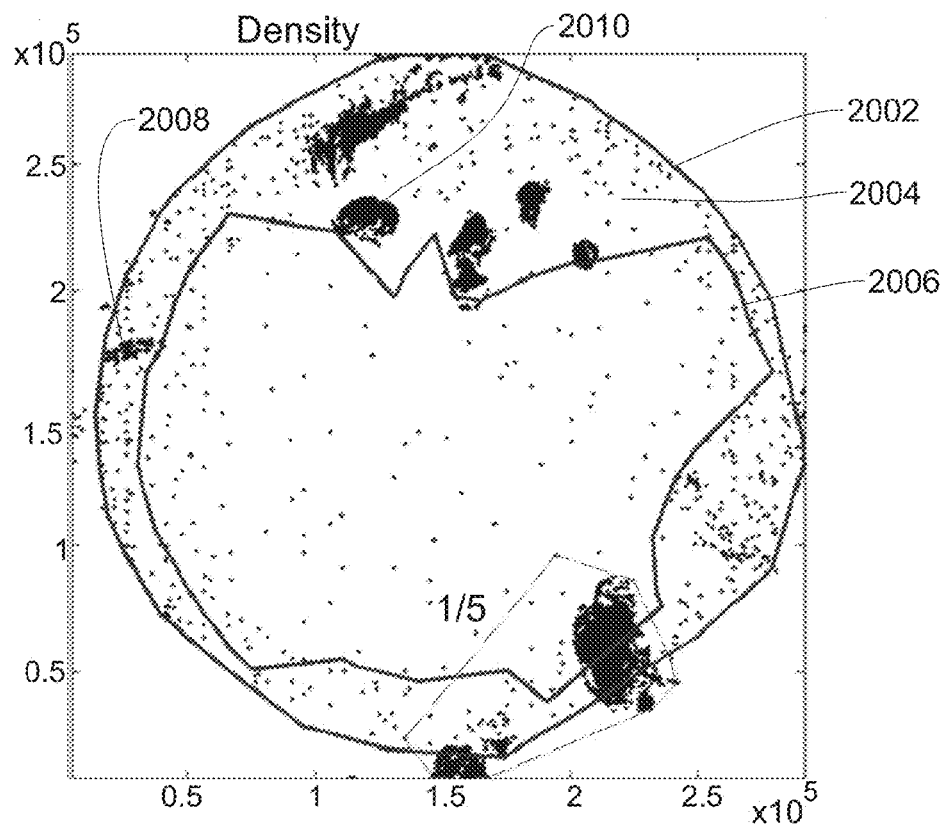
FIG. 20 illustrates a density test, in accordance with some embodiments of the presently disclosed subject matter.

FIG. 20 illustrates a density test, in accordance with some embodiments of the presently disclosed subject matter. In this figure of a defect map, the convex hull 2002 of a polar signature 2004 is shown as well as the inner boundary 2006 of the polar signature. Assuming the density of Cartesian signature 2008 (between convex hull 2002 and inner boundary 2004 of polar signature 2104) is at or below a predetermined function of the density of polar signature 2004, Cartesian signature 2008 may be combined with polar signature 2004 and may cease to be considered a distinct signature. Assuming the density of Cartesian signature 2010 (between convex hull 2002 and inner boundary 2004 of polar signature 2104) is however above a predetermined function of the density of polar signature 2004, Cartesian signature 2010 may not be combined with polar signature 2104.

Additionally or alternatively for instance, a radius test may be indicative of a relationship between an average radius for defects in a Cartesian signature and inner and outer radial limits of a polar signature. Depending on the relationship, at least part of the Cartesian signature may be combined with at least part of the polar signature or the Cartesian signature may not be combined with the polar signature. In some cases of this instance, inner and outer radial limits for the polar signature may be respectively set to the minimum and maximum radii for 90% of the defects in the polar signature. The minimum and maximum radii for 90% of the defects in the polar signature, for instance, may be equivalent to the minimum and maximum radii for 90% of the defects included between the convex hull and the inner boundary. In this instance, if the average radius of the defects in a Cartesian signature is between these inner and outer radial limits, then at least part of the Cartesian signature may be combined with at least part of the polar signature (e.g. the Cartesian signature may cease to be considered as a distinct signature). Otherwise, if the average radius of the defects in a Cartesian signature is not between these radial limits, the Cartesian and polar signatures may remain distinct, but common defects may be reported only once (e.g. in the denser signature).

Figure 21:
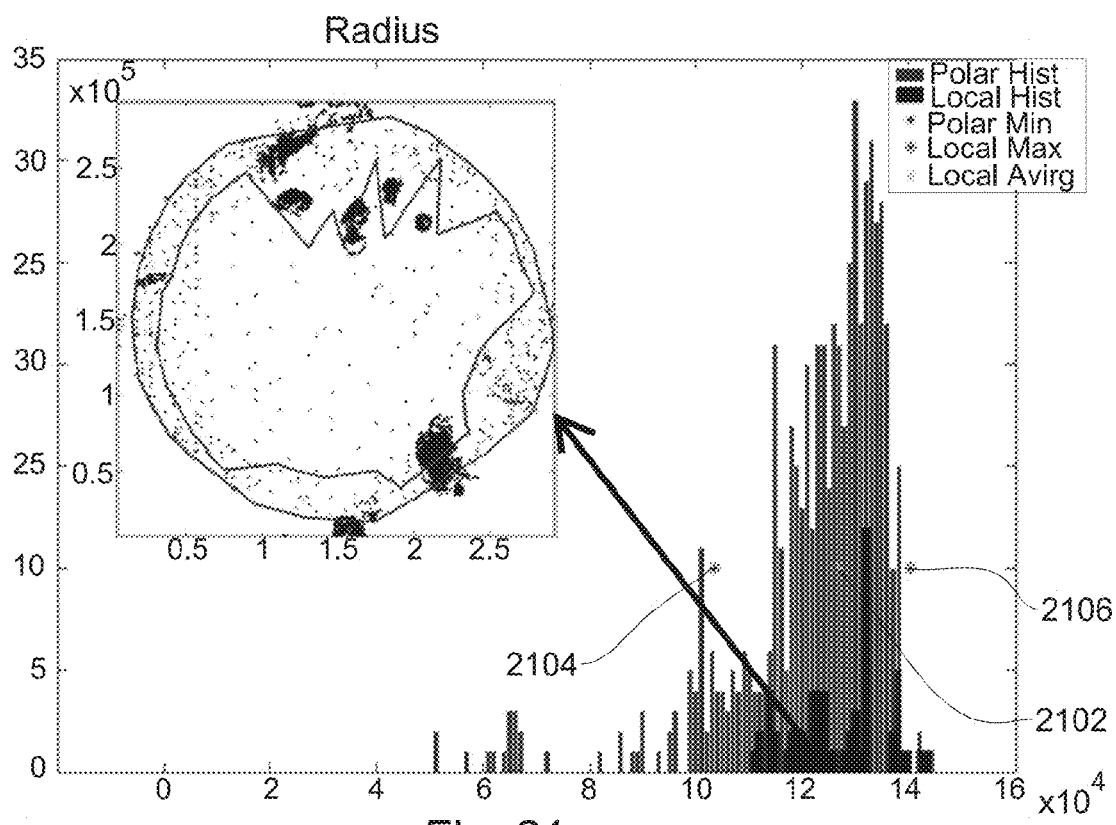
FIG. 21 illustrates a radius test, in accordance with some embodiments of the presently disclosed subject matter.

FIG. 21 illustrates a radius test, in accordance with some embodiments of the presently disclosed subject matter. In this figure the average radius 2102 of a Cartesian signature is between the inner radial limit 2104 and outer radial limit 2106 of a polar signature. Therefore the polar and Cartesian signatures may be combined.

If two or more tests are applied, then depending on the example, the signatures may only be combined if the signatures pass all of the tests, a majority of the tests, at least one of the tests, etc.

Optionally when combining a Cartesian signature and polar signature, if the percent difference between the number of defects in the Cartesian signature and the number of defects in the polar signature is lower than a minimal percent difference, then any defects that are only included in one of the signatures may not be included in the combined signature.

Additionally or alternatively when combining a Cartesian signature and polar signature, optionally if the difference between the number of defects in the Cartesian signature and the number of defects in the polar signature is lower than a minimal difference, then any defects that are only included in one of the signatures may not be included in the combined signature.

Optionally, when checking for the percent difference and/or the difference between the number of defects, certain defects may be ignored. For instance, in order to not skew the number of defects in the polar signature, defects which are also included in a certain number of the densest Cartesian signature(s) that overlap with the polar signature may be ignored when counting the number of defects in the polar signature.

Figure 22:
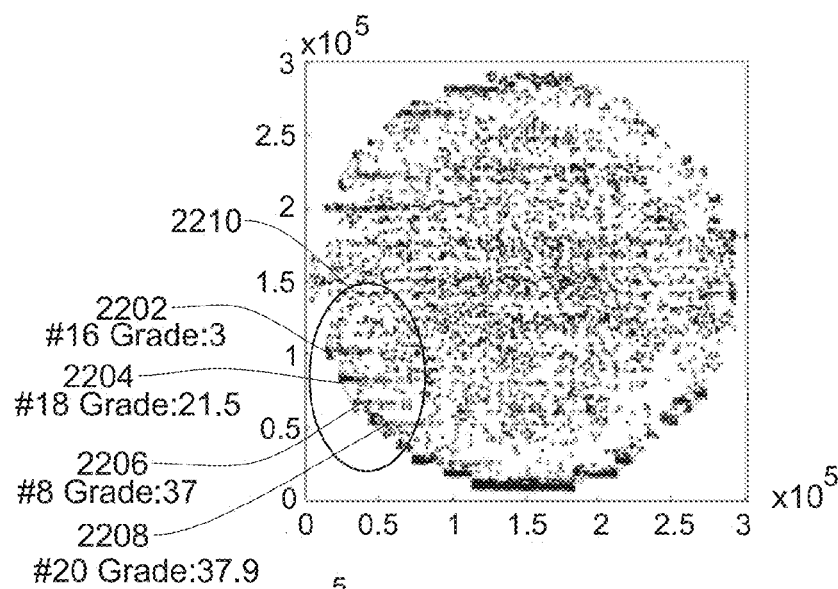
FIGS. 22 to 24 illustrate the combination of Cartesian and polar signatures, in accordance with some embodiments of the presently disclosed subject matter.
Figure 23:
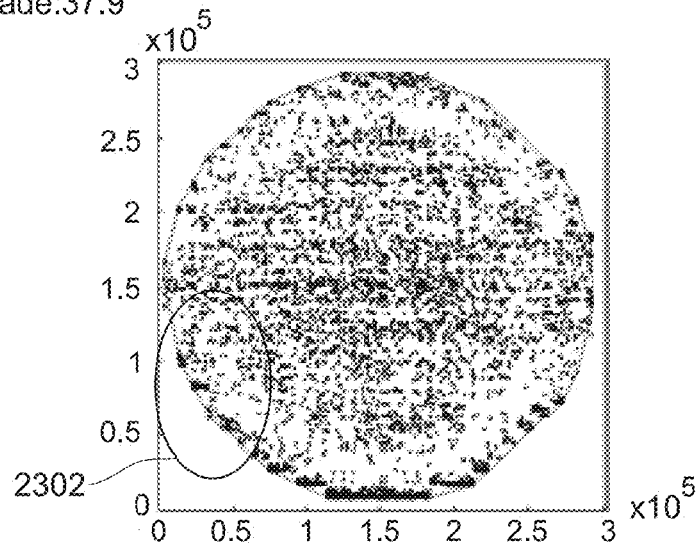
Figure 24:
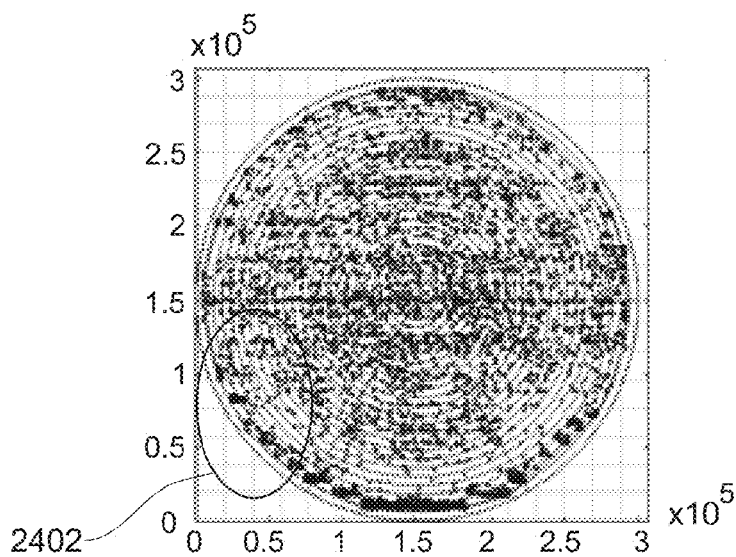

FIGS. 22 to 24 illustrate the combination of Cartesian and polar signatures, in accordance with some embodiments of the presently disclosed subject matter. The defect map of FIG. 22 shows four Cartesian signatures 2202, 2204, 2206, and 2208 within oval 2210. The defect map of FIG. 23 shows part of one polar signature within oval 2302 (in the same part of the defect map as oval 2210). In the defect map of FIG. 24, Cartesian signatures 2402, 2404, 2406 and 2408 are combined with the polar signature and therefore cease to be listed separately in oval 2302.

In optional stage 198, characterizing, filtering, separating and/or other action(s) may be performed on the detected signature(s). The detected signature(s) on which characterizing and/or filtering may be performed may include Cartesian signature(s) (unified and/or associated with single resolution level(s)), polar signature(s) (unified and/or associated with single resolution level(s)), and/or combined signature(s). In some cases, stage 198 may not be performed for a signature which is the same signature that underwent characterizing and filtering earlier in method 100.

Characterizing may include determining any of the following attributes, inter-alia: detection procedure (e.g. Cartesian, polar, both), angle of signature measured from the center of the article, radius (e.g. distance between center of article to signature center or that distance normalized by radius of article), type (e.g. polar if detection procedure is polar or both, angle is greater than a minimum angle, and radius is within allowed range; otherwise Cartesian), number of defects in signature, grade of signature (e.g. equaling grade of section in signature which has the highest grade), area (e.g. of signature or of signature as a percentage of area taken up by entire defect density map), number of sections included in signature, defect locations, density of signature (e.g. number of defects in signature divided by area of signature), etc.

If filtering is performed, the detected signature(s) may be filtered, using any criteria. In some cases, the filtering may use rule(s) relating to real defects, nuisances and/or false alarms. For example, consider a filtering rule that filters out any signature that spans an angle above 270 degrees, and has a radius equal to more than 80% of the radius from the center to the article perimeter. This rule may be used to filter out a signature that may be likely to include defects which are nuisances and caused by polish of the article (e.g. wafer). Additionally or alternatively, in some cases, the detected signature(s) may be filtered for other reasons. For instance, filtering may be performed in order to filter out signatures which are not of interest. Examples of a signature which may possibly not be of interest depending on the viewpoint (e.g. to the method operator and/or customer) may include a signature with defects fairly close to defects of another signature (referred to as superclusters), false alarms, nuisances, etc. It should be evident that what is of interest may vary depending on the implementation.

Method 100 may then end.

The signature(s) which remain at the end of method 100 may include Cartesian signature(s), polar signature(s) and/or combined (polar and Cartesian) signature(s). Possibly, the signature(s) which remain at the end of method 100, may be independent signature(s), each having defects likely caused by independent event(s), (for instance the combining and unifying stages discussed earlier may have enabled non-independent signatures, with defects likely caused by the same event(s), to be merged). Additionally or alternatively, possibly the signature(s) which remain at the end of method 100 may be signature(s) which are of interest (e.g. to the method operator and/or customer). Additionally or alternatively, possibly the signature(s) which remain at the end of method 100 may be signature(s) which include real defects. However, it is also possible that at least part of the signature(s) that remain at the end of method 100 may not be independent, may not be of interest, and/or may include defects which are not all real defects.

Optionally, a sample of defects on the signature(s) remaining at the end of method 100 may be selected for review. Optionally, the defects in the sample (e.g. one or more attributes of the defects) may be outputted.

Optionally, the signature(s) remaining at the end of method 100 may be outputted, e.g. one or more of the attributes of the signature(s)may be outputted.

Figure 25:
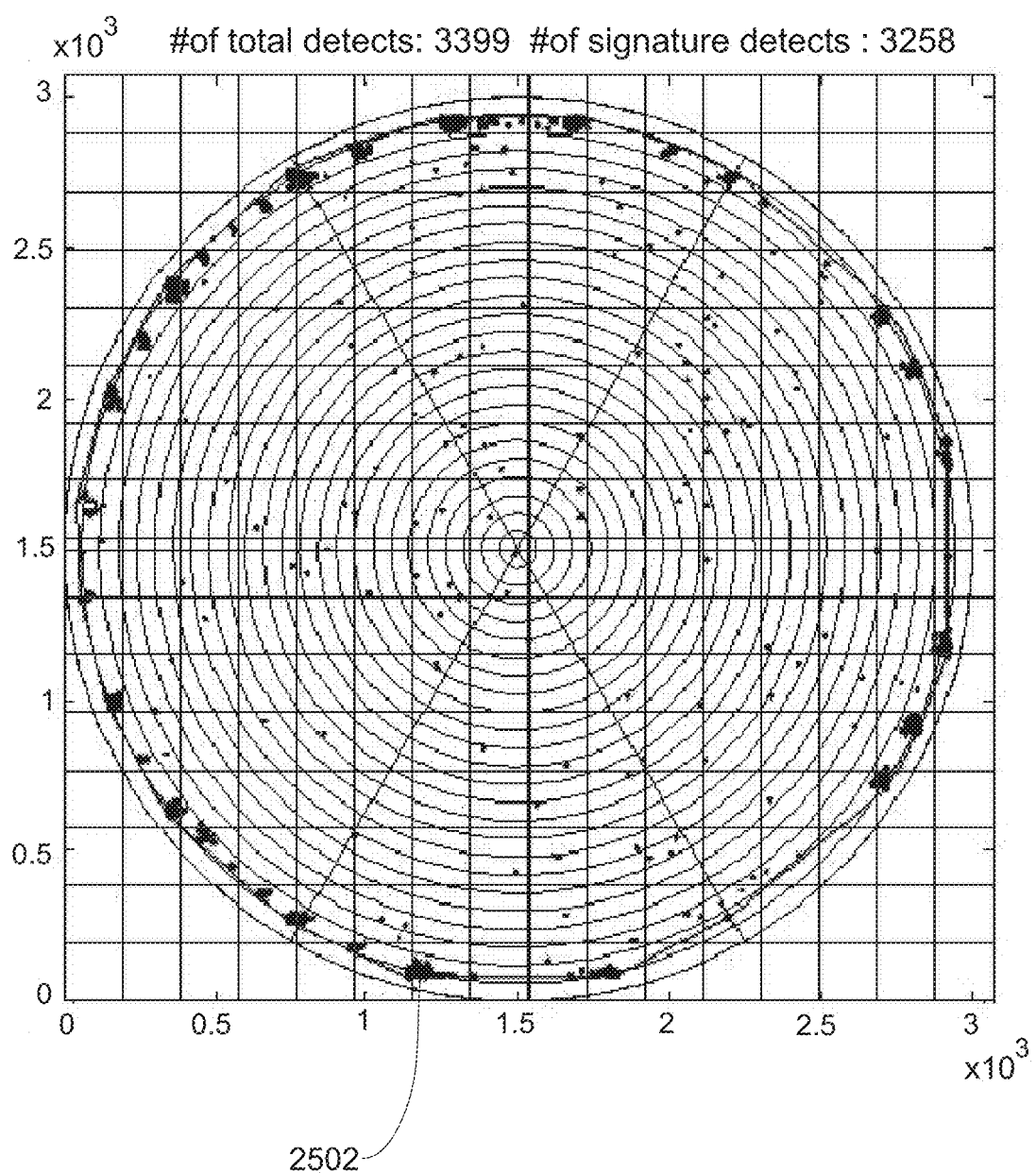
FIG. 25 illustrates a signature map, in accordance with some embodiments of the presently disclosed subject matter.

Optionally, a signature map may be outputted at the end of method 100. For instance the map may show the locations of the remaining signature(s), or a part thereof on the article. Refer to FIG. 25 which illustrates a signature map, in accordance with some embodiments of the presently disclosed subject matter. In this figure, one polar signature 2502 is shown. In this figure, defects which are not included in signature 2502 are also illustrated, but in some embodiments of signature maps, defects which are not included in signatures may not be shown on the signature map. It is noted that in various embodiments, the number of remaining signature(s) may vary and/or the number of signature(s) included in an outputted signature map may vary.

Additionally or alternatively to being outputted after method 100, remaining signature(s), signature map and/or sample defect(s) may optionally be processed further, e.g. at least part may be reviewed. Possibly, at least part of the data after processing may be outputted, e.g. where whether or not to output particular data may be dependent on a result of the processing.

Additionally or alternatively, at least partly based on the performance of method 100, the recipe may optionally be optimized, inspection images may optionally be filtered, and/or other effects may result.

Additionally or alternatively to the embodiments shown in FIG. 1, stages which are shown in FIG. 1 as being executed sequentially may in some embodiments of method 100 be executed in parallel and/or stages shown in FIG. 1 as being executed in parallel may in some embodiments of method 100 be executed sequentially. Additionally or alternatively to the embodiments shown in FIG. 1 method 100 may in some embodiments include more, fewer and/or different stages than illustrated in FIG. 1. Additionally or alternatively to the embodiments shown in FIG. 1, stages of method 100 may in some embodiments be executed in a different order than illustrated in FIG. 1.

Figure 26:
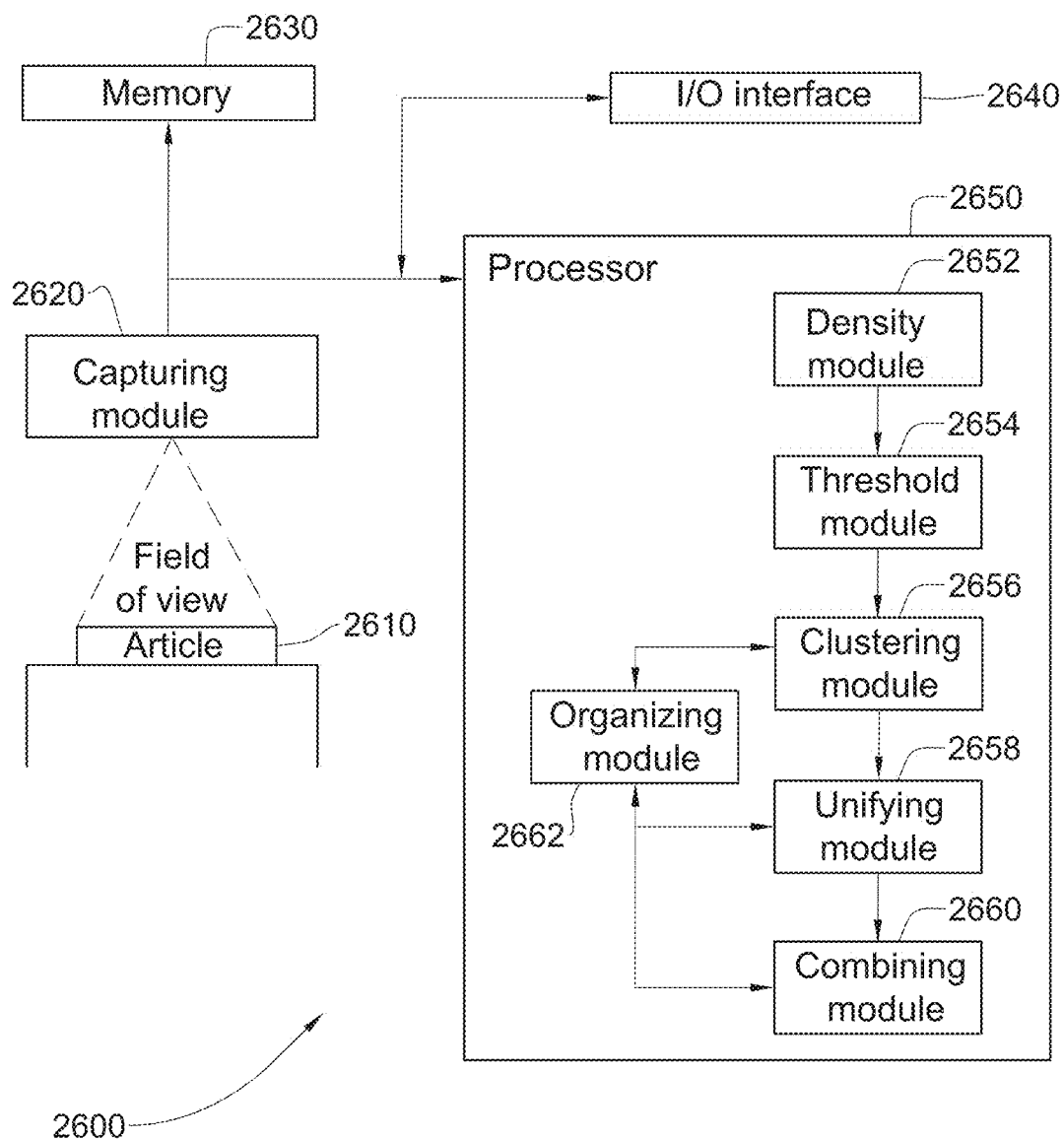
FIG. 26 is a block diagram of a system for signature detection, in accordance with some embodiments of the presently disclosed subject matter.

FIG. 26 is a block diagram of a system 2600 for signature detection, in accordance with some embodiments of the presently disclosed subject matter.

System 2600 may be made up of any combination of software, hardware and/or firmware, which includes at least some hardware. System 2600 may be centralized in one location (in one or more units) or distributed over more than one location. System 2600 may include at least one processor 2650. The at least one processor 2650 may include any combination of one or more modules such as at least one density module 2652, at least one threshold module 2654, at least one clustering module 2656, at least one unifying module 2658, at least one combining module 2660 and/or at least one organizing module 2662. In the case of multiple processors 2650, modules 2652, 2654, 2656, 2658, 2660 and/or 2662 may be divided among processors 2650, and/or a different instance of at least one of module(s) 2652, 2654, 2656, 2658, 2660 and/or 2662 may be included in two or more processors 2650. System 2600 may optionally also include any of the following: at least one memory module 2630, at least one capturing module 2620 and/or at least one I/O interface 2640. For simplicity of description, the description refers to each module (e.g. any of modules 2620, 2630, 2640, 2650, 2652, 2654, 2656, 2658, 2660, 2262) in the single form, and therefore the single form should be construed to cover embodiments where there is one of a given module or a plurality of a given module. Therefore reference to a given module, should be construed as actually referring to "at least one" of the given module. Moreover, for simplicity's sake, the description may attribute a certain task to one or more particular module(s), but the description should be construed to cover embodiments where one or more of the particular module(s), any other module(s), or a combination thereof perform that task.

Processor 2650, for instance density module 2652, may be configured to acquire article density map(s). While not necessarily so, the article corresponding to the article density map(s) may be selected from a group comprising an electronic circuit, wafer, reticle, photomask, fabric, petri dish, a solar cell, a part of any of the above, and so on. Additionally or alternatively, while not necessarily so, the article may be round and/or have a perimeter that is at least partly curved.

Assume that a given article density map may comprise a plurality of sections corresponding to a first resolution level which is indicative of defect numbers for the sections. The subject matter does not limit how such an article defect density map may be acquired. However as discussed above, in some examples, processor 2650 (e.g. density module 2652) being configured to acquire an article density map may include: being configured to acquire an article defect map, divide at least part of the article defect map into the plurality of sections corresponding to the first resolution level, and count defects in each of the sections, thereby giving rise to the defect numbers for the sections. Additionally or alternatively, in some examples, processor 2650 (e.g. density module 2652) being configured to acquire an article density map may include: being configured to acquire an article defect map, divide at least part of the article defect map into the plurality of sections corresponding to the first resolution level, count defects in each of the sections, acquire a scanned portion map, and for at least one of the sections use the scanned portion map to normalize the count by one or more of: scanned portion of the section, or size of the section, thereby giving rise to the defect numbers for the sections. Although the subject matter does not limit the scanned portion map(s) and/or article defect map(s), for the sake of further illustration to the reader some examples regarding the scanned portion map(s) and/or article defect map(s) will now be discussed.

The generation of an inspection image of an article (e.g. article 2610) during a scan of the article may be implemented by any capturing module, many of which are known in the art. The capturing module may be within system 2600 (e.g. capturing module 2620, if included) or external to system 2600. The capturing module may be any module configured to generate an inspection image (e.g. including arrangements of pixels generated one after another) and may include e.g. camera(s) and/or other detector(s). For instance, the capturing module may include optical or electron beam tools having a single detector, multiple detectors, dark field detectors, bright field detectors or any combination of detectors.

An implementation of generating an inspection image may include, for example, the following substages: (a) illuminating the article by a beam; (b) collecting signals arriving from the article; and (c) processing the signals in order to generate, one after another, arrangements of pixels in the inspection image. The beam may be a beam of light (e.g. visible light, infrared light, ultraviolet light, and so on, e.g. a laser), a beam of another kind of electromagnetic radiation (e.g. radio waves, microwaves, X-rays, Gamma rays, etc.), a beam of particles (e.g. a beam of electrons), and so on.

The generated inspection image may be processed by system 2600 (e.g. by capturing module 2620-if included, by processor 2650 and/or by other module(s), possibly between capturing module 2620 and processor 2650). Additionally or alternatively, the generated inspected image may be processed outside of system 2600. The generated inspection image may be processed in order to determine which location(s), if any, to flag as defect(s) on the article. A location may be flagged as a defect for any reason. For instance, the location may be flagged because the location includes a real defect, e.g. an undesirable local change that may render the article inoperable (e.g. if it is an electric chip) or affect its reliability. Additionally or alternatively, for instance, the location may be flagged because the location includes a "nuisance", e.g. a local change which does not affect operability or reliability of the article. Additionally or alternatively, for instance, the location may be flagged due to an apparent "false alarm", e.g. a problem with the inspection system.

Locations on the article may be flagged as defects in accordance with any suitable procedure, which is not limited by the currently disclosed subject matter. For instance, one or more inspection images (e.g. which were generated by collecting signals during one or more scans of the article in the first inspection phase) may be analyzed. A location on the article may be flagged as a defect (e.g. by noting coordinates, index, and/or other information) if a value of a pixel in an inspection image of the article, corresponding to that location, is too different from a corresponding reference value, but this is not necessarily so. See above discussion for examples of a reference value and "too different". An article defect map may be generated by system 2600 (e.g. by capturing module 2620—if included, by processor 2650 and/or other module(s), possibly between capturing module 2620 and processor 2650) and/or outside of system 2600. The article defect map may be based on one or more inspection images of the article in accordance with one or more scan set(s). The article defect map may include the coordinates, indices and/or other information regarding the flagged location(s) on the article.

Scanned portion map(s) may be acquired, e.g. by density module 2652, by determining at least partly based on the data used in one or more scan set(s), by upsampling, by downsampling, and/or by converting as discussed above. A scanned portion map may indicate for each of the plurality of sections comprised in a defect density map, the (actual or estimated) portion which was scanned e.g. as a percentage or fraction. Additionally or alternatively, the scanned portion map may indicate the different section sizes, for instance if the section sizes vary.

Scan set(s) data, recipe(s), defect map(s), scanned portion map(s), etc. may optionally be stored in memory (e.g. memory 2630, if included in system 2600 and/or memory external to system 2600 if any), for instance prior to being used in acquiring defect density map(s).

Memory, such as memory 2630, when included in system 2600, and/or such as memory external to system 2600, if any, (e.g. accessed via input/output interface 2640) may comprise any tangible memory. Memory may be short and/or long term memory, may be volatile (e.g. DRAM, SRAM, etc.) and/or non-volatile (e.g. Hard-drive, Flash memory, etc.), and may be near and/or remote from processor 2650. For instance, memory may store computer readable code. Computer readable code may include code for a signature detection method such as method 100 and/or any other code. Additionally or alternatively, for instance, memory may store data prior to being used by processor

2650, may store data prior to being used by any module in processor 2650, may store interim processing results for any module in processor 2650, may store final processing results for any module in processor 2650, and/or may store final processing results for processor 430.

If input/output interface 2640 (or at least an input interface or an output interface) is included in system 2600, recipe(s) (used for detecting signature(s)), scan set(s) data, defect map(s), etc., may optionally be inputted into system 2600 via input/output interface 2640, e.g. prior to being used in acquiring defect density map(s) by processor 2650. Additionally or alternatively, data may optionally be inputted into system 2600 prior to being used by capturing module 2620. For instance, scan set data may be inputted in order to indicate at least what should be scanned on the article by capturing module 2620 and/or may be inputted in order to indicate at least what was previously scanned on the article for use by processor 2650. However, the subject matter does not limit what may be inputted into system 2600, if anything.

Input/output interface 2640, when included in system 2600, may include any suitable hardware, firmware and/or software interface(s). Possibly input/output interface 2640 may only include an output interface or an input interface, or may include both (integrated or not integrated together). To enable input by a user, for instance, interface 2640 may include a hardware, firmware and/or software user interface (e.g. including any of keyboard, microphone, display, touchscreen, Graphical User Interface ("GUI"), voice recognition software, etc). For instance, to enable input from a (non-human) element outside of system 2600, interface 2640 may include a hardware, firmware and/or software communication interface from the outside element. For instance, to enable output to a user, interface 2640 may include a hardware, firmware and/or software user interface (e.g. including any of display, speaker, touchscreen, GUI, etc). For instance, to enable output to an outside (non-human) element, interface 2640 may include a hardware, firmware and/or software communication interface (e.g. for a wired connection, wireless connection, etc) to the outside element. Possibly an element outside of system 2600 may include an outside memory and/or any other element.

The subject matter does not limit data which may be output via input/output interface 2640 but for the sake of further illustration to the reader some examples are now provided. For example, part or all of the detected signature(s) may be outputted (e.g. attribute(s) of the signature(s)), a signature map may be outputted, a sample of defect(s) may be outputted (e.g. attribute(s) of the defect(s)), etc. Outputting may include displaying the outputted data, transmitting the outputted data, storing the outputted data in a memory outside of system 2600, outputting the data to a processor outside of system 2600 for further processing (e.g. if system 2600 does not include functionality for reviewing sample defect(s)). It is noted that in addition to or instead of outputting, data may be stored in memory 2630 and/or processed further by processor 2650 (e.g. if system 2600 includes functionality for reviewing sample defect(s)). If data is processed further, then possibly at least part of the data after processing may later be outputted, e.g. where whether or not to output particular data may be dependent on a result of the processing. Additionally or alternatively, system 2600 may allow for the recipe to be optimized, inspection images may optionally be filtered, etc.

A GUI, for instance, may allow a user to view output such as detected signature(s), signature map, sample of defects, etc. Additionally or alternatively, a GUI may allow a user to initially set or change data (e.g. recipe data, scan set data, etc), and/or may allow a user to cause a signature detection method such as method 100 to execute. The user may possibly thereby view the effect of the setting/changing on the output. Additionally or alternatively, the GUI may allow the user to save a log of the execution or multiple executions of signature detection. In some other embodiments, a GUI may allow more, fewer, and/or different type(s) of interfacing with the user.

Scan set data, for instance, may include any specification regarding the scanning of an article by a capturing module such as capturing module 2620 (e.g. what was or is to be scanned on the article, pixel size, beam, charging conditions, etc). A recipe, for instance, may include any specification regarding execution of any of the stages of a signature detection method such as method 100 by a processor such as processor 2650.

Processor 2650 may be configured at least to acquire article defect density map(s), to determine distribution(s), to determine threshold(s) in accordance with distribution(s), to identify sections, and/or to cluster sections into signatures. Processor 2650 may include any module(s) configured to perform such operation(s) and/or other operation(s). Processor 2650 may in some embodiments be configured to perform a signature detection method such as method 100 or a part thereof.

For simplicity's sake, FIG. 26 shows six modules 2652, 2654, 2656, 2658, 2660, 2662, any of which may be included in processor 2650.

For example, density module 2652 may be configured to acquire an article defect density map comprising a plurality of sections corresponding to a first resolution level which is indicative of defect numbers for the sections and to determine a distribution representative of the defect numbers or function thereof.

Additionally or alternatively, density module 2652 may, for instance, be configured for each of one or more other resolution levels to acquire an article defect density map comprising a plurality of sections corresponding to the other resolution level which is indicative of defect numbers for the sections, and to determine a distribution representative of the defect numbers or function thereof.

Any article defect density map may comprise sections defined by polar coordinates or sections defined by Cartesian coordinates. In some embodiments, density module 2652 may, for instance, be configured to acquire article defect density map(s), each comprising a plurality of sections defined by polar coordinates corresponding to a respective resolution level, and indicative of defects numbers for the sections, and to determine distribution(s), each representative of the defect numbers of function thereof; and density module 2652 may, for instance, be configured to acquire article defect density map(s), each comprising a plurality of sections defined by Cartesian coordinates corresponding to a respective resolution level, and indicative of defects numbers for the sections, and to determine distribution(s), each representative of the defect numbers of function thereof.

As mentioned above, an article defect density map acquired by density module 2652 may optionally also include one or more "trivial" sections.

Additionally or alternatively, density module 2652 may, for instance, be configured to perform one or more stages of a signature detection method such as method 100. For example, density module 2652 may be configured to perform any of the following stages of method 100: stage 104, 108, 112, 116, 120, 124, 128, 152, 156, 160, 164, 168 and/or 172. Optionally, density module 2652 may be configured to perform different stage(s) of method 100 and/or stage(s) of a different signature detection method in addition to or instead of one or more of these stages.

For example, threshold module 2654 may, for instance, be configured to determine a threshold in accordance with the distribution representative of the defect numbers or function thereof, and to identify sections, out of the plurality of sections in the article defect density map corresponding to the first resolution level, with defect numbers or function thereof above the threshold.

Additionally or alternatively, threshold module 2654 may, for instance, be configured for each of one or more other resolution levels to determine a threshold in accordance with the respective distribution representative of the defect numbers or function thereof, and to identify sections, out of the plurality of sections in the article defect density map corresponding to the other resolution level, with defect numbers or function thereof above the threshold.

If there are article defect density map(s) comprising sections defined by polar coordinates as well as article defect density map(s) comprising sections defined by Cartesian coordinates, threshold module 2654, may for instance be configured to determine a threshold in accordance with the respective distribution associated with the respective article defect density map.

Additionally or alternatively, threshold module 2654 may, for instance, be configured to perform one or more stages of a signature detection method such as method 100. For example, threshold module 2654 may be configured to perform stage 132 and/or 176. Optionally, threshold module 2654 may be configured to perform different stage(s) of method 100 and/or stage(s) of a different signature detection method in addition to or instead of one or more of these stages.

For example, clustering module 2656 may be configured to cluster at least part of adjoining identified sections corresponding to the first resolution level, into one or more signatures, and thus may be configured to detect these one or more signatures.

Additionally or alternatively, clustering module 2656 may, for instance, be configured for each of one or more other resolution levels to cluster at least part of adjoining sections into one or more signatures, and thus may be configured to detect these one or more signatures.

If there are article defect density map(s) comprising sections defined by polar coordinates as well as article defect density map(s) comprising sections defined by Cartesian coordinates, clustering module 2656, may for instance be configured to cluster at least part of adjoining sections into one or more polar and/or Cartesian signatures, and thus may be configured to detect these one or more signatures.

Additionally or alternatively, clustering module 2656 may, for instance, be configured to perform one or more stages of a signature detection method such as method 100. For example, clustering module 2656 may be configured to perform stage 136 and/or 180. Optionally, clustering module 2656 may be configured to perform different stage(s) of method 100 and/or stage(s) of a different signature detection method in addition to or instead of one or more of these stages.

For example, unifying module 2658 may be configured to unify at least part of overlapping detected signatures from a plurality of resolution levels. The overlapping detected signatures may correspond to article defect density maps comprising sections defined by polar coordinates. Additionally or alternatively, the overlapping detected signatures may correspond to article defect density maps comprising sections defined by Cartesian coordinates.

Additionally or alternatively, unifying module 2658 may, for instance, be configured to perform one or more stages of a signature detection method such as method 100. For example, unifying module 2658 may be configured to perform stage 144 and/or 188. Optionally, unifying module 2658 may be configured to perform different stage(s) of method 100 and/or stages of a different signature detection method in addition to or instead of one or more of these stages.

For example, combining module 2660 may be configured to combine at least part of at least one detected Cartesian signature and at least part of at least one detected polar signature into a combined detected signature.

Additionally or alternatively, combining module 2660 may, for instance, be configured to perform one or more stages of a signature detection method such as method 100. For example, combining module 2660 may be configured to perform stage 196. Optionally, combining module 2660 may be configured to perform different stage(s) of method 100 and/or stage(s) of a different signature detection method in addition to or instead of one or more of these stages.

For example, organizing module 2662 may be configured for a detected signature to perform any of a group of actions. The group of actions may include, for instance: characterizing, filtering, or separating at least partly by at least one of: radius, angle, density, area, grade, number of defects, ratio of number of defects, resolution gap, detection procedure, type, number of sections, defect locations, superclusters, real defects, nuisances, or false alarms.

Additionally or alternatively, organizing module 2662 may, for instance, be configured to perform one or more stages of a signature detection method such as method 100. For example, organizing module 2662 may be configured to perform any of the following stages of method 100: stage 140, 148, 184, 192, and/or 198. Optionally, organizing module 2662 may be configured to perform different stage(s) of method 100 and/or stage(s) of a different signature detection method in addition to or instead of one or more of these stages.

Processor 2650 may in some embodiments include fewer, more and/or different modules than shown in FIG. 26. For instance, different module(s) may arise from module(s) being combined and/or divided. Additionally or alternatively to the embodiments described with reference to FIG. 26, functionality may in some embodiments be divided differently among modules of processor 2650, and/or may be divided into fewer, more and/or different modules of processor 2650. Therefore any function attributed to a certain module in processor 2650 in some embodiments herein may additionally or alternatively be performed by other module(s). Additionally or alternatively to the embodiments described with reference to FIG. 26, processor 2650 may in some embodiments include additional, less, and/or different functionality than described herein. For instance processor 2650 may include additional functionality relating to signature detection and/or functionality unrelated to signature detection. Although processor 2650 may execute one or more stages of method 100 or variants thereof, different processor(s) may additionally or alternatively execute one or more stages of method 100 or variants thereof.

In some embodiments, existing lower resolution inspection tools such as the Elite or UVision inspection systems by Applied Materials and/or existing review inspection tools (which may be of a higher resolution) such as a scanning electron microscope SEM may be adapted so as to include the functionality of system 2600 or a part thereof. However, this is not necessarily so and in some embodiments, at least part of the functionality of system 2600 may be implemented on a standalone basis and/or as part of a new inspection tool.

Additionally or alternatively, system 2600 may in some embodiments include fewer, more and/or different modules than shown in FIG. 26. For instance, different module(s) may arise from module(s) being combined and/or divided. Additionally or alternatively, the functionality of system 2600 may in some embodiments be divided differently among the modules illustrated in FIG. 26. Therefore any function attributed to a certain module in an embodiment herein may additionally or alternatively be performed by different module(s). Additionally or alternatively, the functionality of system 2600 described herein may in some embodiments be divided into fewer, more and/or different modules than shown in FIG. 26. Additionally or alternatively, system 2600 may in some embodiments include additional, less, and/or different functionality than described herein. For instance system 2600 may include functionality not described herein, relating to signature detection and/or unrelated to signature detection.

Additionally or alternatively, different embodiments of a signature detection system such as system 2600, or a part thereof, may implement different embodiments of a signature detection method such as method 100 or a part thereof, even if not explicitly elaborated upon. Additionally or alternatively, different embodiments of a signature detection method such as method 100, or a part thereof, may include stages whose execution fulfills different embodiments of a signature detection system such as system 2600, or a part thereof, even if not explicitly elaborated upon.

The subject matter contemplates, for example, a computer program being readable by a computer for executing a method or part of a method disclosed herein. Further contemplated by the subject matter, for example, is a computer program product comprising a computer-useable medium tangibly embodying program code readable by a computer for executing a method or part of a method disclosed herein. The computer program product may be equivalently expressed as a program storage device that is readable by machine, tangibly embodying a program of instructions executable by the machine to perform a method or part of a method disclosed herein.

Referring to method 100 generally, it is noted that if method 100 is a computerized method, a program of instructions (also known as program code) may be implemented, which, when executed by a processor such as processor 2650, results in the execution of method 100, or any part thereof. Instructions may be included in the program of instructions for executing some or all of the stages of method 100 (in all possible combinations suggested above), even if such instructions have not been explicitly elaborated upon.

While embodiments of the subject matter have been shown and described, the subject matter is not thus limited. Numerous modifications, changes and improvements within the scope of the subject matter will now occur to the reader.

The invention claimed is:

1. A system for signature detection, comprising:
a memory; and
a processor, coupled to the memory, to:
acquire an article defect density map comprising a plurality of sections corresponding to a first resolution level which is indicative of defect numbers for the sections, and to determine a distribution representative of the defect numbers or function thereof;
determine a threshold in accordance with said distribution, and to identify sections, out of said plurality of sections in the article defect density map, with defect numbers or function thereof above the threshold; and
cluster at least part of adjoining identified sections, into one or more signatures, and thus configured to detect said one or more signatures.

2. The system of claim 1, wherein to acquire said article defect density map, the processor is to acquire an article defect map, to divide at least part of said article defect map into the plurality of sections corresponding to the first resolution level, and to count defects in each of the sections, thereby giving rise to the defect numbers for the sections.

3. The system of claim 1, wherein to acquire said article defect density map, the processor is to acquire an article defect map, to divide at least part of said article defect map into the plurality of sections corresponding to the first resolution level, to count defects in each of the sections, to acquire a scanned portion map, and for at least one of the sections to use the scanned portion map to normalize the count by one or more of: scanned portion of the section or size of the section, thereby giving rise to the defect numbers for the sections.

4. The system of claim 1, wherein the plurality of sections is defined by polar coordinates.

5. The system of claim 1, wherein for each of one or more other resolution levels, the processor is to acquire the article defect density map comprising a plurality of sections corresponding to the other resolution level, to determine a distribution, to determine a threshold, to identify sections, to cluster into one or more signatures to detect said one or more signatures for the other resolution level, and to unify at least part of overlapping detected signatures from a plurality of resolution levels.

6. The system of claim 1, wherein the processor is to detect at least one polar signature using at least one article defect density map, each comprising a plurality of sections defined by polar coordinates corresponding to a respective resolution level, and to detect at least one Cartesian signature using at least one article defect density map, each comprising a plurality of sections defined by Cartesian coordinates corresponding to a respective resolution level, and to combine at least part of at least one detected Cartesian signature and at least part of at least one detected polar signature into a combined detected signature.

7. The system of claim 6, wherein for a detected Cartesian signature and a detected polar signature with at least one defect in common, the processor is to determine whether or not to combine at least part of said detected signature and at least part of said polar signature, depending on a result of at least one test, wherein said at least one test includes one or more of: a radius test indicative of a relationship between an average radius for defects in the detected Cartesian signature and inner and outer radial limits of the detected polar signature, or a density test indicative of a relationship between a density of the detected Cartesian signature and a density of the detected polar signature.

8. The system of claim 1, wherein each at least one of the one or more detected signatures, is graded with a grade that is at least partly dependent on the threshold.

9. The system of claim 1, wherein the processor is further to perform, for a detected signature which includes at least part of at least one of said one or more detected signatures, any of a group of actions, said group including: characterizing, filtering, or separating at least partly by at least one of: radius, angle, density, area, grade, number of defects, ratio of number of defects, resolution gap, detection procedure, type, number of sections, defect locations, superclusters, interest real defects, nuisances, or false alarms.

10. The system of claim 1, wherein said article density map is a density map for an article which is at least one of: round, or has a perimeter that is at least partly curved.

11. A method of signature detection, comprising:
acquiring an article defect density map comprising a plurality of sections corresponding to a first resolution level which is indicative of defect numbers for the sections, and determining a distribution representative of the defect numbers or function thereof;
determining a threshold in accordance with said distribution, and identifying sections, out of said plurality of sections in the article defect density map, with defect numbers or function thereof above the threshold; and
clustering at least part of adjoining identified sections, into one or more signatures, thus detecting said one or more signatures.

12. The method of claim 11, wherein said acquiring said article defect density map includes: acquiring an article defect map, dividing at least part of said article defect map into the plurality of sections corresponding to the first resolution level, and counting defects in each of the sections, thereby giving rise to the defect numbers for the sections.

13. The method of claim 11, wherein said acquiring said article defect density map includes: acquiring an article defect map, dividing at least part of said article defect map into the plurality of sections corresponding to the first resolution level, counting defects in each of the sections, acquiring a scanned portion map, and for at least one of the sections using the scanned portion map to normalize the count by one or more of: scanned portion of the section, or size of the section, thereby giving rise to the defect numbers for the sections.

14. The method of claim 11, wherein the plurality of sections is defined by polar coordinates.

15. The method of claim 11, wherein said method comprises for each of one or more other resolution levels: acquiring an article defect density map comprising a plurality of sections corresponding to the other resolution level, determining a distribution, determining a threshold, identifying sections, and clustering into one or more signatures, thus detecting said one or more signatures for the other resolution level, said method further comprising: unifying at least part of overlapping detected signatures from a plurality of resolution levels.

16. The method of claim 11, wherein said method comprises: detecting at least one polar signature using at least one article defect density map, each comprising a plurality of sections defined by polar coordinates corresponding to a respective resolution level, and detecting at least one Cartesian signature using at least one article defect density map, each comprising a plurality of sections defined by Cartesian coordinates corresponding to a respective resolution level, said method further comprising: combining at least part of at least one detected Cartesian signature and at least part of at least one detected polar signature into a combined detected signature.

17. The method of claim 11, wherein each at least one of the one or more detected signatures, is graded with a grade that is at least partly dependent on the threshold.

18. The method of claim 11, wherein said method further comprises: performing for a detected signature which includes at least part of at least one of said one or more detected signatures, any of a group of actions, said group including: characterizing, filtering, or separating at least partly by at least one of: radius, angle, density, area, grade, number of defects, ratio of number of defects, resolution gap, detection procedure, type, number of sections, defect locations, superclusters, interest, real defects, nuisances, or false alarms.

19. A computer program product comprising a non-transitory computer useable medium having computer readable code embodied therein for signature detection, the computer program product comprising:
computer readable program code for causing a computer to acquire an article defect density map comprising a plurality of sections corresponding to a first resolution level which is indicative of defect numbers for the sections, and to determine a distribution representative of the defect numbers or function thereof;
computer readable program code for causing a computer to determine a threshold in accordance with said distribution, and to identify sections, out of said plurality of sections in the article defect density map, with defect numbers or function thereof above the threshold; and
computer readable program code for causing a computer to cluster at least part of adjoining identified sections, into one or more signatures, and thus to detect said one or more signatures.

20. The computer program product of claim 19, wherein the plurality of sections is defined by polar coordinates.

* * * * *